United States Patent
Maxik et al.

(10) Patent No.: US 9,578,710 B2
(45) Date of Patent: *Feb. 21, 2017

(54) WAVELENGTH SENSING LIGHTING SYSTEM AND ASSOCIATED METHODS

(71) Applicant: ENVIRONMENTAL LIGHT TECHNOLOGIES CORP., Melbourne, FL (US)

(72) Inventors: Fredric S. Maxik, Cocoa Beach, FL (US); Eric Bretschneider, Bowling Green, KY (US); Pedro Medelius, Merritt Island, FL (US); David E. Bartine, Cocoa, FL (US); Robert R. Soler, San Marcos, CA (US); Gregory Flickinger, Indialantic, FL (US)

(73) Assignee: Environmental Light Technologies Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,807

(22) Filed: Feb. 26, 2016

(65) Prior Publication Data
US 2016/0183343 A1    Jun. 23, 2016

Related U.S. Application Data

(63) Continuation of application No. 14/748,691, filed on Jun. 24, 2015, now Pat. No. 9,307,608, which is a
(Continued)

(51) Int. Cl.
*H04B 10/00* (2013.01)
*H05B 33/08* (2006.01)
(Continued)

(52) U.S. Cl.
CPC ......... *H05B 33/0854* (2013.01); *H04B 10/07* (2013.01); *H04B 10/116* (2013.01);
(Continued)

(58) Field of Classification Search
CPC . H04B 10/116; H04B 10/112; H04B 10/1123; H04B 10/1127; H04B 10/1129; H04B 10/114; H04B 10/1143; H04B 10/1149; H05B 33/0854; H05B 33/0857
(Continued)

(56) References Cited

U.S. PATENT DOCUMENTS 7,729,941 B2    6/2010    Zampini et al.
8,242,476 B2 *  8/2012    Mimeault ............. G01S 7/4814
                                                          250/221

(Continued)

FOREIGN PATENT DOCUMENTS

WO    WO 2011 016860 A1    2/2011

*Primary Examiner* — Hahn Phan
(74) *Attorney, Agent, or Firm* — Mark Malek; Daniel Pierron; Widerman Malek, PL

(57) ABSTRACT

A wavelength sensing lighting system that may comprise a light source included in an array to emit illuminating light, the array including a plurality of light sources, a sensor included in the array configured to sense environmental light from an environment, and a controller operatively connected to each of the sensor and the light source and may be configured to analyze the environmental light sensed by the sensor to at least one of detect and generate data relating to a condition of the environment, the data being transmittable in a data light. The controller may be configured to receive the data included in the data light using the sensor. The controller may be configured to analyze the data and to control the transmission of the data light from the light source.

17 Claims, 34 Drawing Sheets

Related U.S. Application Data continuation of application No. 14/333,200, filed on Jul. 16, 2014, now Pat. No. 9,125,275, which is a continuation of application No. 13/901,169, filed on May 23, 2013, now Pat. No. 8,818,202, which is a continuation of application No. 13/300,930, filed on Nov. 21, 2011, now Pat. No. 8,515,289.

(51) Int. Cl.
  *H05B 37/02*      (2006.01)
  *H04B 10/07*      (2013.01)
  *H04B 10/116*     (2013.01)

(52) U.S. Cl.
  CPC ..... *H05B 33/0818* (2013.01); *H05B 33/0869* (2013.01); *H05B 37/0218* (2013.01); *H05B 37/0272* (2013.01)

(58) Field of Classification Search
  USPC ....... 398/172, 118, 119, 127, 130, 128, 135, 398/33, 34, 169, 170, 182, 183, 202, 208, 398/209, 136, 25, 103, 115, 189; 315/152, 315/312, 153, 291, 292, 293, 308, 185 R, 315/185 S; 362/231, 545, 555, 234, 253
  See application file for complete search history.

(56) References Cited

U.S. PATENT DOCUMENTS

| | | | |
|---|---|---|---|
| 8,515,289 B2* | 8/2013 | Maxik | H05B 33/0818 315/152 |
| 8,818,202 B2* | 8/2014 | Maxik | H05B 33/0818 315/152 |
| 9,125,275 B2* | 9/2015 | Maxik | H05B 33/0818 |
| 9,307,608 B2* | 4/2016 | Maxik | H05B 33/0818 |
| 2009/0297166 A1* | 12/2009 | Nakagawa | G09F 9/33 398/172 |
| 2010/0077840 A1 | 4/2010 | Srivastava et al. | |
| 2012/0001567 A1* | 1/2012 | Knapp | H04L 12/282 315/291 |

* cited by examiner

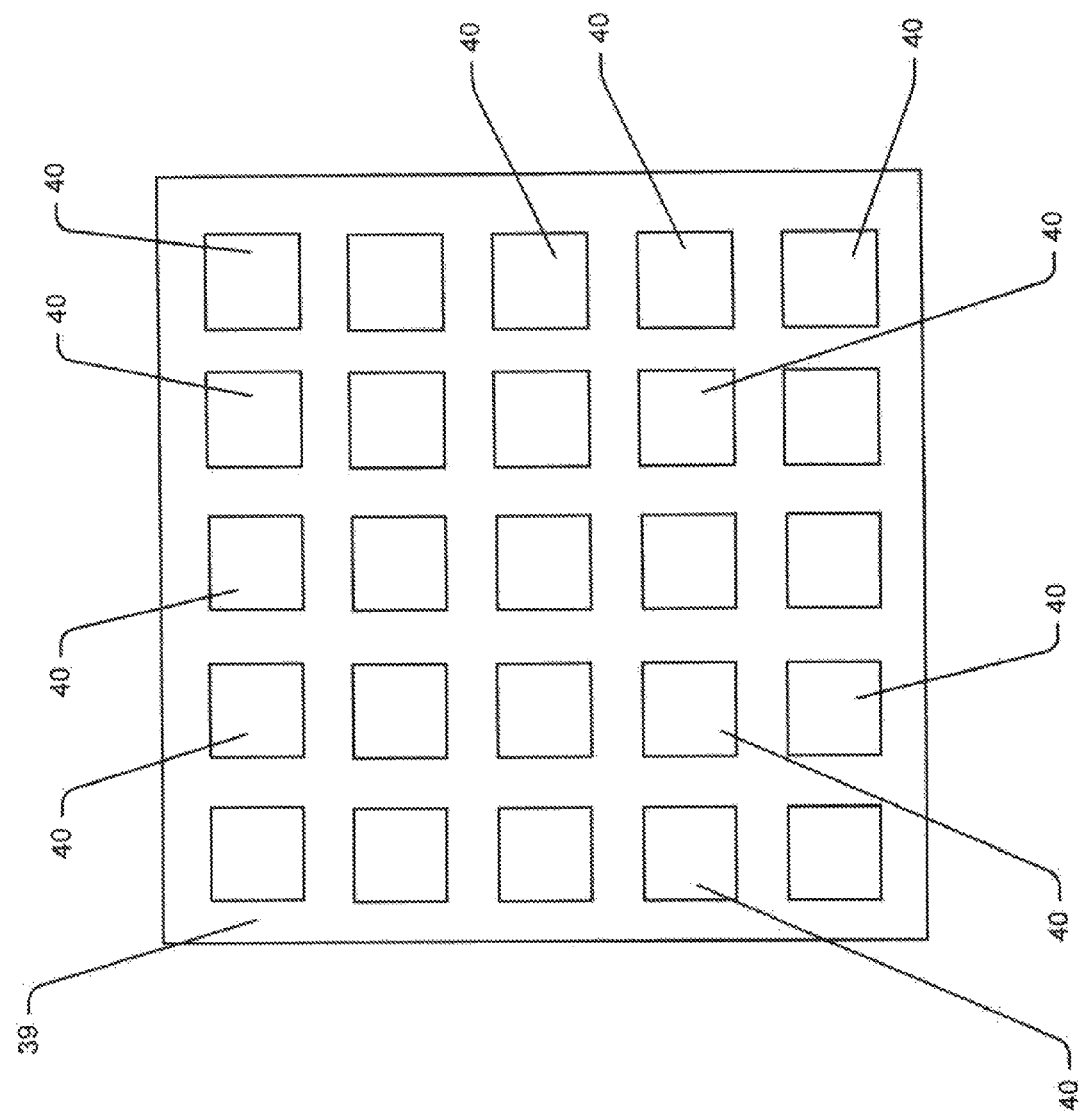

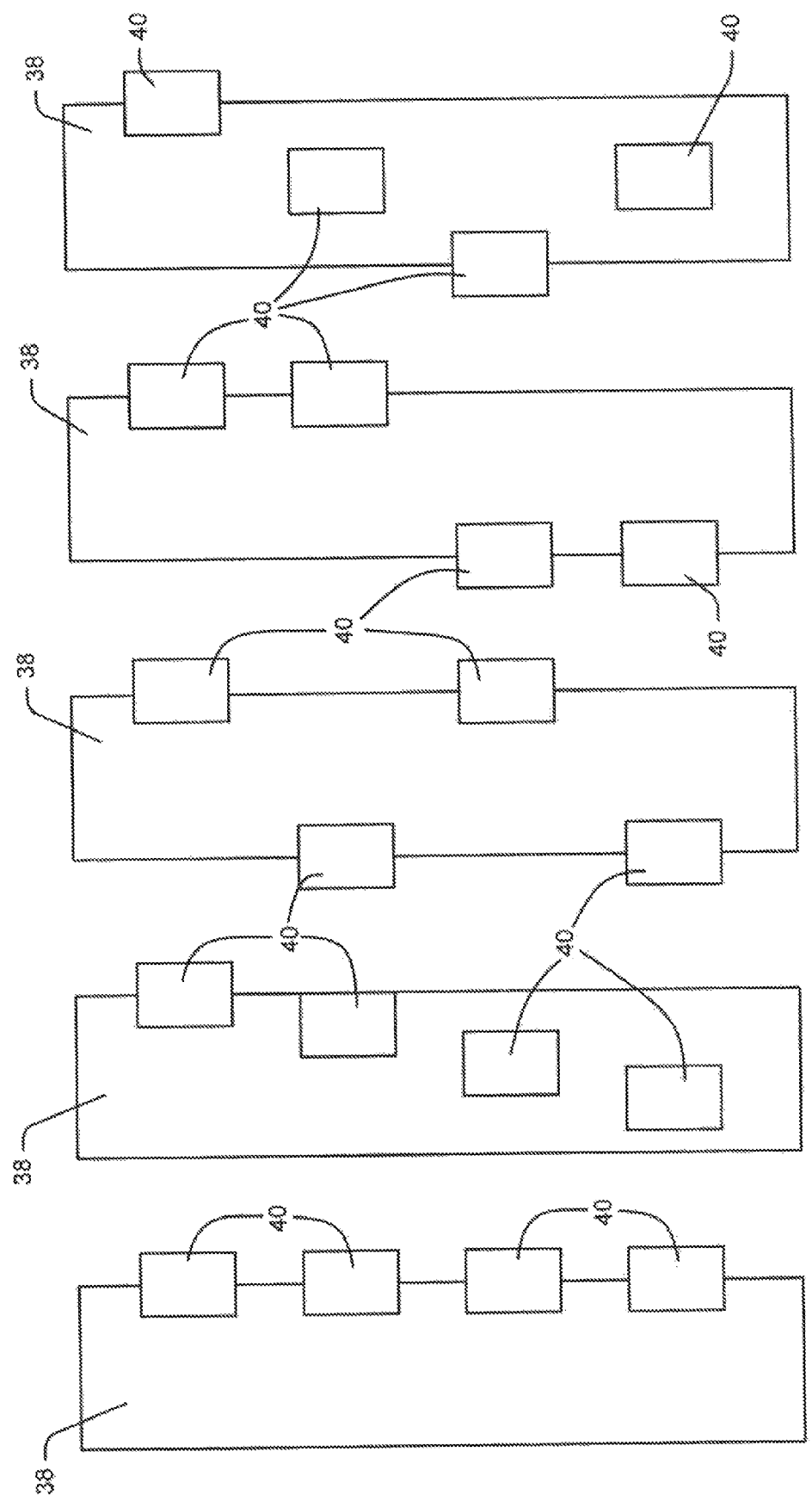

| E | E | S | E |
|---|---|---|---|
| E | S | E | E |
| S | E | E | S |
| E | E | S | E |

FIG. 21

| S | E | E | S |
|---|---|---|---|
| E | E | S | E |
| E | S | E | E |
| S | E | E | S |

FIG. 22

| E | S | E | E |
|---|---|---|---|
| S | E | E | S |
| E | E | S | E |
| E | E | S | E |

FIG. 23

| E | S | E | S |
|---|---|---|---|
| S | E | S | E |
| E | S | E | S |
| S | E | S | E |

FIG. 24

| E | E | E | E |
|---|---|---|---|
| E | E | E | E |
| E | E | E | S |
| E | E | E | E |

FIG. 25

| S | E | E | E |
|---|---|---|---|
| E | E | S | E |
| E | E | E | E |
| E | E | E | S |

FIG. 26

| E | E | E | E |
|---|---|---|---|
| E | E | E | E |
| E | E | E | E |
| E | E | E | E |

FIG. 27

| S | S | S | S |
|---|---|---|---|
| S | S | S | S |
| S | S | S | S |
| S | S | S | S |

FIG. 28

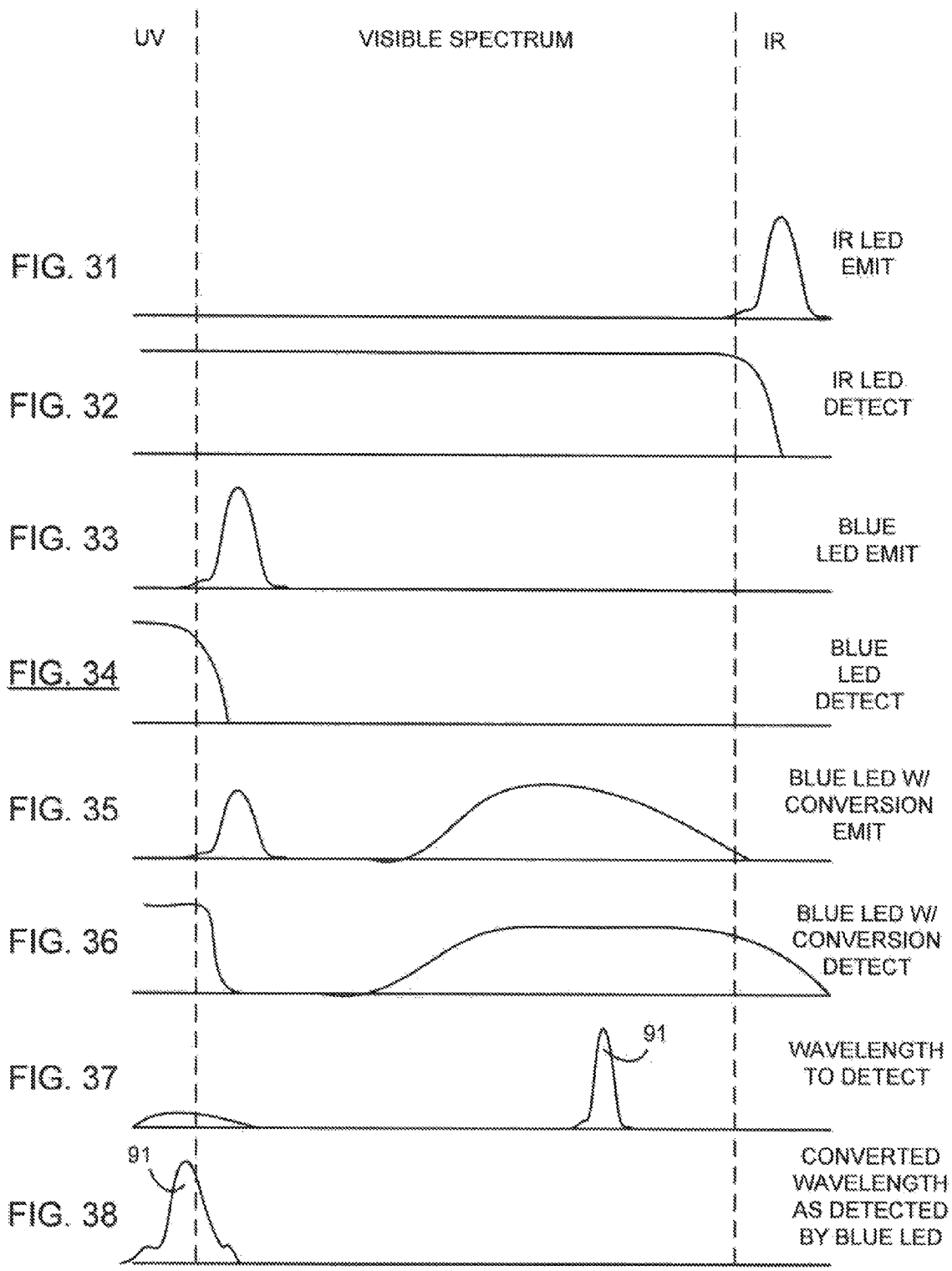

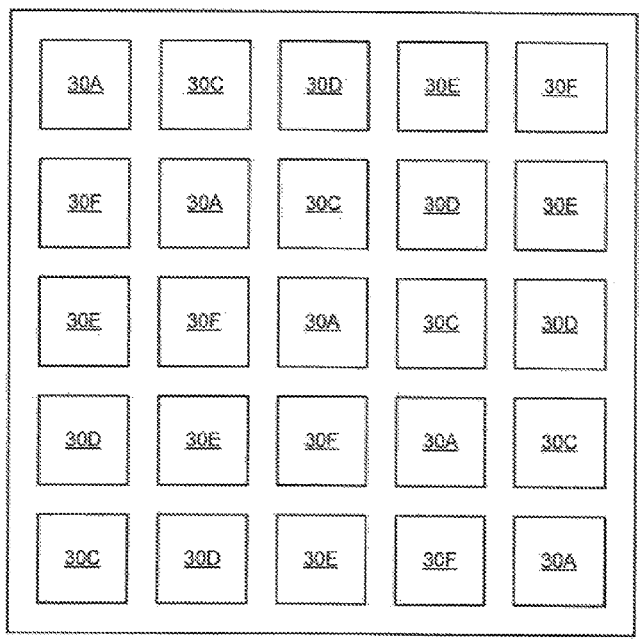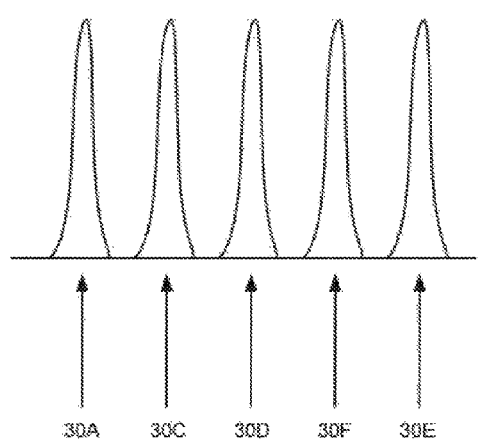
FIG. 42
FIG. 43

| 0 | 0 | 0 | 0 | 0 | 0 | 0 | 0 |
|---|---|---|---|---|---|---|---|
| 0 | 0 | 1 | 0 | 0 | 1 | 0 | 0 |
| 0 | 2 | 3 | 2 | 0 | 4 | 2 | 0 |
| 0 | 2 | 4 | 1 | 1 | 3 | 2 | 0 |
| 0 | 1 | 2 | 1 | 0 | 0 | 0 | 0 |
| 0 | 0 | 1 | 0 | 0 | 0 | 1 | 0 |
| 0 | 2 | 4 | 2 | 0 | 0 | 0 | 0 |
| 1 | 3 | 4 | 1 | 1 | 0 | 0 | 1 |
FIG. 48
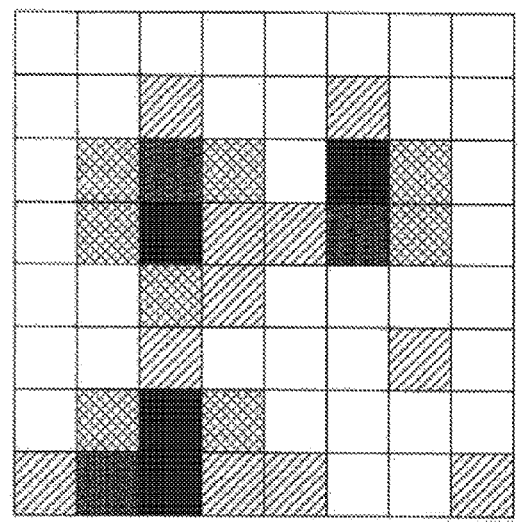
FIG. 49
| 0 | 0 | 0 | 0 | 0 | 0 | 0 | 0 |
|---|---|---|---|---|---|---|---|
| 0 | 0 | 1 | 0 | 0 | 0 | 1 | 0 |
| 0 | 2 | 4 | 2 | 0 | 2 | 4 | 2 |
| 1 | 3 | 4 | 1 | 1 | 3 | 4 | 1 |
| 0 | 0 | 0 | 0 | 0 | 0 | 0 | 0 |
| 0 | 0 | 0 | 0 | 0 | 0 | 1 | 0 |
| 0 | 0 | 0 | 0 | 0 | 2 | 4 | 2 |
| 1 | 0 | 0 | 0 | 1 | 3 | 4 | 1 |
FIG. 50
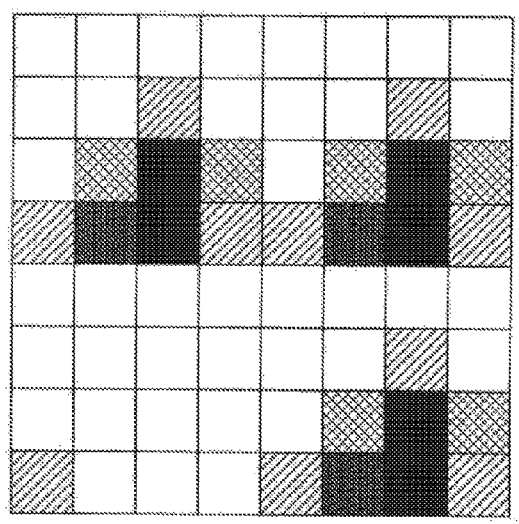
FIG. 51

WAVELENGTH SENSING LIGHTING SYSTEM AND ASSOCIATED METHODS

RELATED APPLICATIONS

This application is a continuation application under 35 U.S.C. §120 of U.S. patent application Ser. No. 14/748,691 titled Wavelength Sensing Lighting System and Associated Methods filed Jun. 24, 2015, which in turn is a continuation of U.S. patent application Ser. No. 14/333,200 titled Wavelength Sensing Lighting System and Associated Methods for National Security Application filed Jul. 16, 2014, now U.S. Pat. No. 9,125,275, which is in turn a continuation of U.S. patent application Ser. No. 13/901,169 titled Wavelength Sensing Lighting System and Associated Methods for National Security Application filed May 23, 2013, now U.S. Pat. No. 8,818,202, which is in turn a continuation of U.S. patent application Ser. No. 13/300,930 titled Wavelength Sensing Lighting System and Associated Methods for National Security Application filed Nov. 21, 2011, now U.S. Pat. No. 8,515,289, which is related to and incorporates the content of U.S. patent application Ser. No. 13/269,222 titled Wavelength Sensing Lighting System and Associated Method filed Oct. 7, 2011 now U.S. Pat. No. 8,492,995, the contents of each of which is incorporated by reference herein in their entireties except to the extent disclosure therein is inconsistent with disclosure herein.

FIELD OF THE INVENTION

The present invention relates to the field of lighting systems and, more specifically, to lighting systems that can emit and sense light within a wavelength range, and associated methods.

BACKGROUND OF THE INVENTION

Lighting systems have been used to illuminate spaces since the discovery of fire. Over the years, technology has brought us the incandescent light, which produces light by heating a metal filament, causing it to radiate heat. Although the incandescent light is capable of illuminating an area, it does so with little efficiency.

The fluorescent lamp was introduced to provide comparable light while using less energy. The fluorescent lamp excites a gas, such as mercury vapor, within a confined volume. The atoms of the excited gas typically produce ultraviolet light as it moves between energy levels. The ultraviolet light is then absorbed by a conversion material, such as a phosphor. The phosphor may shift the wavelength range of the absorbed light, emitting a light with longer wavelengths. This shift may be known to skilled artisans as a Stokes shift. This phosphor-emitted or converted light may be within the visible spectrum, which may be used to illuminate a space.

Seeking additional efficiency, continuing advancements in technology have brought the light emitting semiconductor device, and more specifically, the light emitting diode. Light emitting diodes may emit light when driven by an electrical current. Like fluorescent lights, conversion materials may be applied to a light emitting semiconductor device to alter the wavelength range of the light used to illuminate a space.

Lighting systems that include a conversion material may conveniently allow the conversion of a source light emitted from a light source into light of a different wavelength range. Often, such a conversion may be performed by using a luminescent, fluorescent, or phosphorescent material. The wavelength conversion materials may sometimes be included in the bulk of another material, applied to a lens or optic, or otherwise located in line with the light emitted from light source. In some instances the conversion material may be applied to the light source itself. A number of disclosed inventions exist that describe lighting devices that utilize a conversion material applied to an LED to convert light with a source wavelength range into light with a converted wavelength range.

Additional strategies to reduce power consumption involve controlling a lighting system to illuminate a space only when the illumination is required. Traditionally, toggle switches have been included in lighting circuits to allow a user to directly control the operational state of the light. Additionally, timers maybe be included in the light circuit to turn a light on and off according to a predetermined or dynamic timing schedule. However, switches and timers offer little flexibility unless directly engaged by a user.

Sensors may additionally be included in lighting systems to control operation upon the sensed compliance with a desired event. As an example, sensors may determine the level of light in a space, which may, in turn, cause a lighting system to be turned on upon sensing that a value falls below a threshold value. As an additional example, sensors may detect the presence of movement in a space to control illumination. However, including dedicated sensors may increase the number of parts and complexity required to build the lighting system, thereby increasing its manufacturing cost.

Additionally, each lighting device may operate independent of other lighting devices, requiring sensors included in each lighting device, further increasing production costs. Some proposed solutions have included wireless radio transmitters in the lighting systems, to allow communication between the devices included therein. However, the inclusion of wireless radios further increases the complexity and number of components included in the lighting system.

One proposed solution is described in by international patent application publications WO 2011/016860, WO 2011/008251, WO 2010/098811, and WO 2010/027459, each by Knapp, and that each involve using the light emitting semiconductor device to perform the operations of a photodiode during portions of the duty cycle when the light emitting semiconductor device is not emitting light. The aforementioned Knapp applications additionally recite using the light emitting semiconductor devices to transmit and receive bi-directional communication between devices included in the lighting system. However, the Knapp applications employ data transmission methods that may result in redundant data transmission, decreasing the effective throughput of the system. Additionally, the Knapp applications lack advanced wavelength sensing functionality, limiting the effectiveness of the system disclosed therein.

There exists a need for a wavelength lighting system that can emit an illuminating light and sense an environmental light by altering its operational state between various portions of the duty cycle. There further exists a need for a lighting system that can analyze the sensed environmental light to alter the characteristics of the nodes included in the lighting system. There exists a need for a lighting system that includes a wavelength conversion material to expand the wavelength range of light that may be emitted or detected by a light emitting semiconductor device. Additionally, there exists a need for a lighting system wherein the nodes intercommunicate to increase the effectiveness of the system.

SUMMARY THE INVENTION

With the foregoing in mind, embodiments of the present invention are related to a wavelength sensing lighting system that may comprise a light source included in an array to emit illuminating light, the array including a plurality of light sources, a sensor included in the array configured to sense environmental light from an environment, and a controller operatively connected to each of the sensor and the light source and may be configured to analyze the environmental light sensed by the sensor to at least one of detect and generate data relating to a condition of the environment, the data being transmittable in a data light. The controller may be configured to receive the data included in the data light using the sensor. The controller may be configured to analyze the data included in the data light and to control the transmission of the data light from the light source.

In some embodiments, the light source may be selectively operable between a sensing operation and an emitting operation, the sensing operation being defined by the light source sensing the environmental light, and the emitting operation being defined by the light source emitting the illuminating light. Additionally, the array may include a plurality of light emitting semiconductor devices. Furthermore, each of the plurality of light emitting semiconductor devices in the array may be selectively operable between the sensing operation and the emitting operation.

In some embodiments, the sensor may be configured to sense the environmental light substantially simultaneously with the light source emitting the illuminating light. The controller may be configured to analyze the environmental light by measuring a drive voltage of the light source, determining a difference between a measured voltage across the light source and the drive voltage, and performing time-domain matching of the measured voltage and the environmental light using cross-correlation.

In some embodiments, the light source may include a light emitting diode (LED). Furthermore, the sensor may include a photodiode to sense the environmental light.

The lighting system may further comprise a network comprised of nodes; wherein each node includes the light source, the sensor, and the controller; and wherein the nodes are configured to intercommunicate by transmitting and receiving the data light. Additionally, the data light may include at least one addressing bit to address the node intended to receive the data. Furthermore, each of the nodes in the network may be proximately aware of additional nodes in the network. The controller of each node included in the network of the nodes may be configured to receive feedback regarding an analysis performed by the controller to be stored in memory. Additionally, the controller may be configured to use at least one of machine learning and a neural network to analyze the feedback from the analysis.

In some embodiments, the data included in the data light may include at least one error detection bit. In additional embodiments, the lighting system may further comprise a wavelength conversion material positioned between the light source and the environment to absorb at least part of a source light sand emit a converted light having a converted wavelength range, the source light being received and absorbed by the wavelength conversion material. Furthermore, the converted wavelength range of the converted light may vary depending on a condition in the environment.

In some embodiments, the data light may be defined by a data wavelength defined relative to the illuminating light.

Additionally, further embodiments of the invention are directed to a lighting system that may comprise a light emitting semiconductor device included in an array that may emit illuminating light and operable between a sensing operation defined by the light emitting semiconductor device and an emitting operation defined by the light emitting semiconductor device emitting the illuminating light, the array including a plurality of light sources. The lighting system may further comprise a switching circuit that may be configured to alternate the light emitting semiconductor device between the sensing operation and the emitting operation and a controller that may be operatively connected to the light emitting semiconductor device and may be configured to analyze the environmental light sensed by the light emitting semiconductor device to at least one of detect and generate data relating to a condition of the environment, the data being transmittable in a data light. The controller may be configured to receive the data included in the data light using the light emitting semiconductor device. Additionally, the controller may be configured to analyze the data included in the data light and to control the transmission of the data light from the light emitting semiconductor device.

In some embodiments, the lighting system may comprise a network of nodes. Each node may include the light emitting semiconductor device, the sensor, and the controller. Furthermore, the controller of each node included in the network of the nodes may be configured to receive feedback regarding an analysis performed by the controller to be stored in memory; and wherein the controller of the node controls transmitting the feedback to the additional nodes. Additionally, the controller may be configured to use at least one of machine learning and a neural network to analyze the feedback from the analysis.

In some embodiments, the data included in the data light includes at least one error detection bit. In some embodiments, the data light may be defined by a data wavelength defined relative to the illuminating light.

BRIEF DESCRIPTION OF THE DRAWINGS

FIG. 3 is schematic diagram of an array of light emitting semiconductor devices in a lighting system according to an embodiment of the present invention.

FIGS. 3F-3J are schematic diagrams depicting an array of light emitting semiconductor devices on a substrate in a lighting system according to an embodiment of the present invention.

FIGS. 21-28 are schematic diagrams of an array of light emitting semiconductor devices of the lighting system according to an embodiment of the present invention wherein some of the light emitting semiconductor devices are in an emitting operation and some of the light emitting semiconductor devices are in a sensing operation.

FIG. 31 is a diagram indicating the relative luminosity of light emitted by an infrared LED, according to an embodiment of the present invention.

FIG. 32 is a diagram indicating the relative luminosity of light detectable by an infrared LED, according to an embodiment of the present invention.

FIG. 33 is a diagram indicating the relative luminosity of light emitted by a blue LED, according to an embodiment of the present invention.

FIG. 34 is a diagram indicating the relative luminosity of light detectable by a blue LED, according to an embodiment of the present invention.

FIG. 35 is a diagram indicating the relative luminosity of light emitted by a blue LED, which includes light converted by a wavelength conversion material, according to an embodiment of the present invention.

FIG. 36 is a diagram indicating the relative luminosity of light detectable by a blue LED, which includes light converted by a wavelength conversion material, according to an embodiment of the present invention.

FIG. 37 is a diagram indicating the relative luminosity of light to be detected in an example, according to an embodiment of the present invention.

FIG. 38 is a diagram indicating the relative luminosity of light by a detected in an example, which has been converted by a wavelength conversion material, according to an embodiment of the present invention.

FIG. 42 is a block diagram of an array of light emitting semiconductor devices to communicate data light using multiple channels, according to an embodiment of the present invention.

FIG. 43 is a diagram indicating the relative luminosity of the channels generated by the array of FIG. 42.

FIGS. 45A, 450, and 45E are diagrams indicating the relative luminosity of the channels generated by the array of FIG. 44.

FIGS. 48-51 are schematic diagrams showing a correlation of data sensed in a data light using the lighting system according to an embodiment of the present invention to an image.

DETAILED DESCRIPTION OF THE PREFERRED EMBODIMENT

Figure 1:
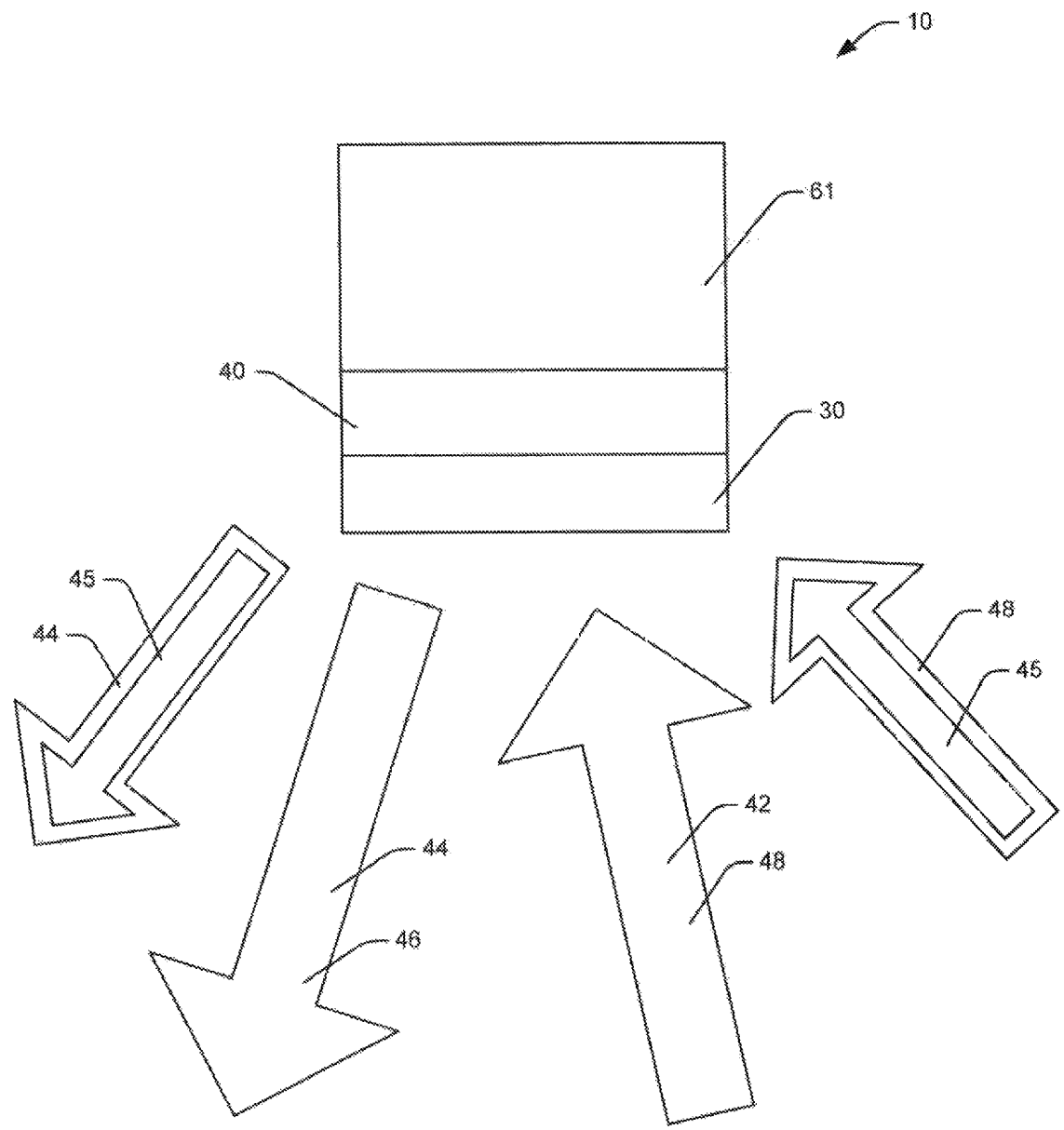
FIG. 1 is a schematic diagram of a lighting system according to an embodiment of the present invention.
Figure 2:
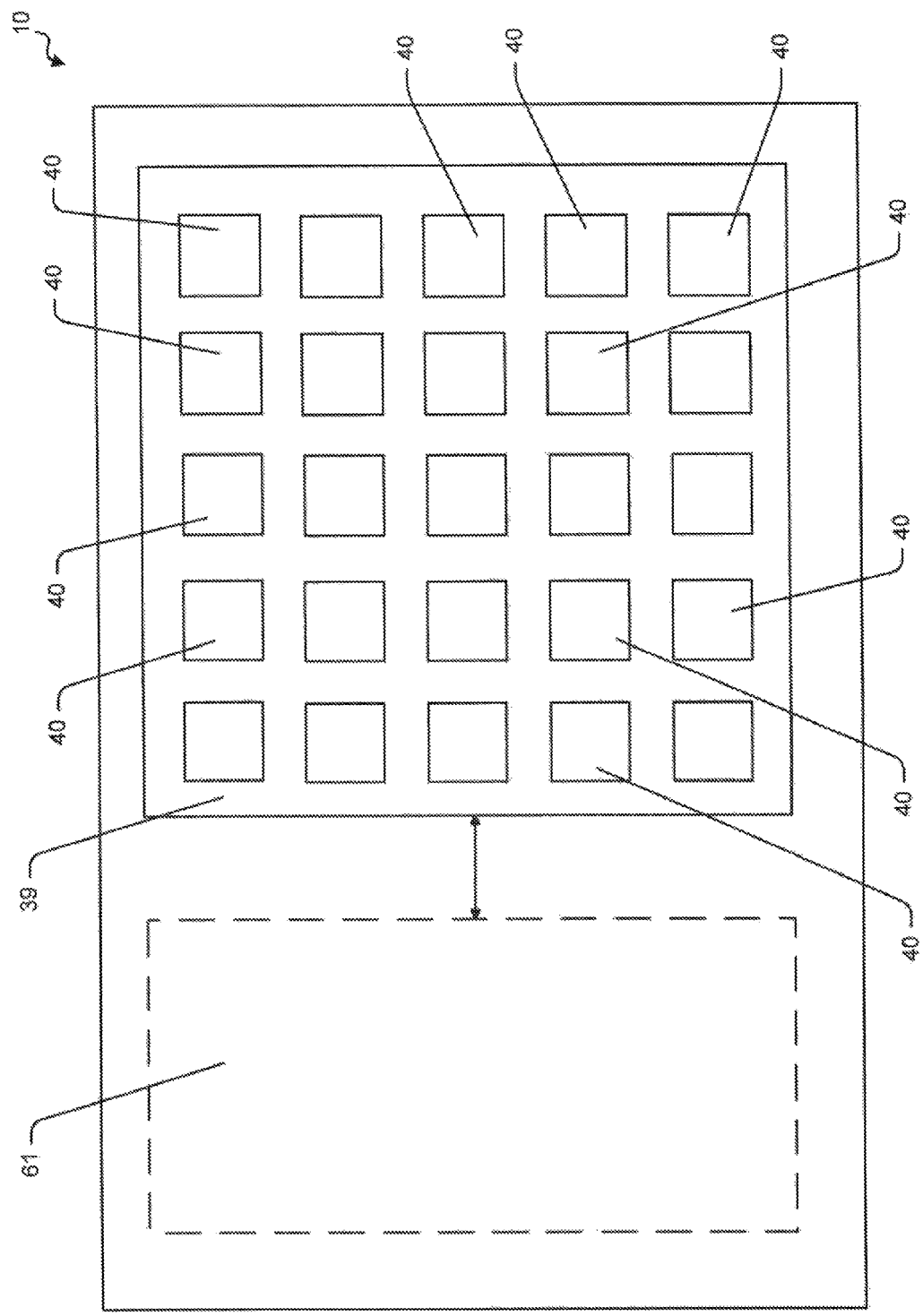
FIG. 2 is a schematic diagram of a lighting system according to an embodiment of the present invention showing a plurality of light emitting semiconductor devices arranged in an array.
Figure 3A:
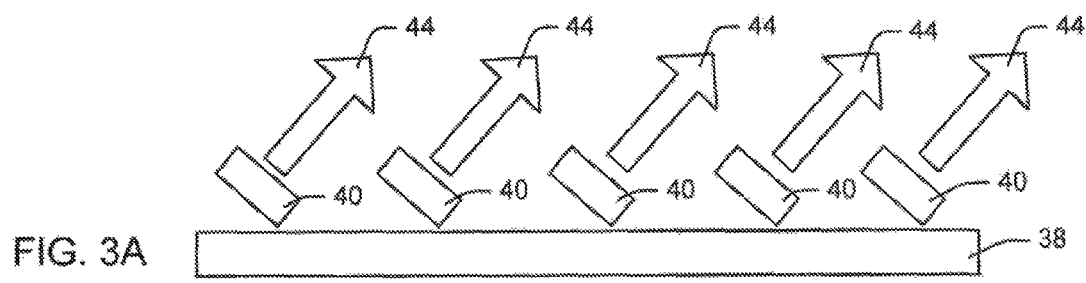
FIGS. 3A-3E are schematic diagrams depicting an array of light emitting semiconductor devices on a substrate and arranged to emit illuminating light in various directions (FIGS. 3A-3D) and receive environmental light from various directions (FIG. 3E).
Figure 3B:
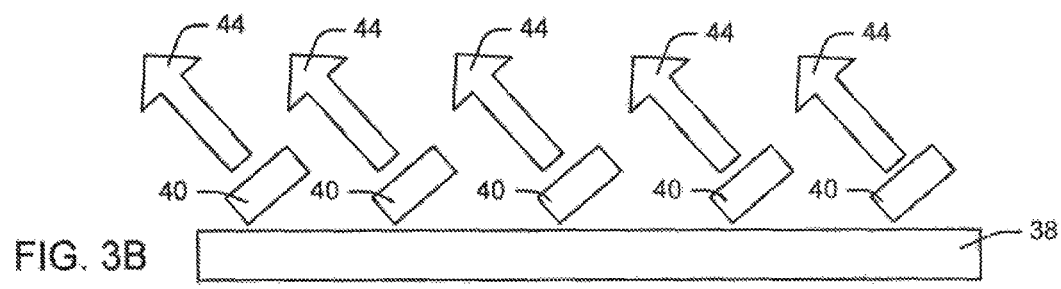
Figure 3C:
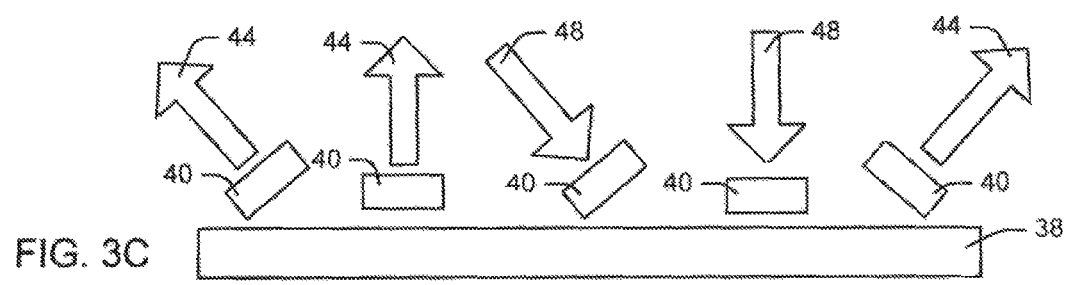
Figure 3D:
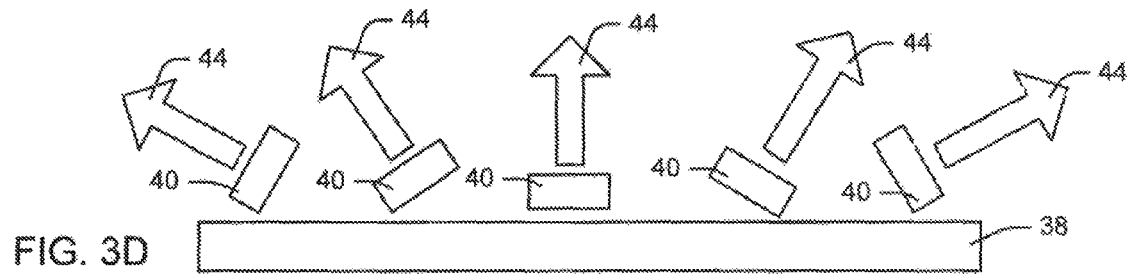
Figure 3E:
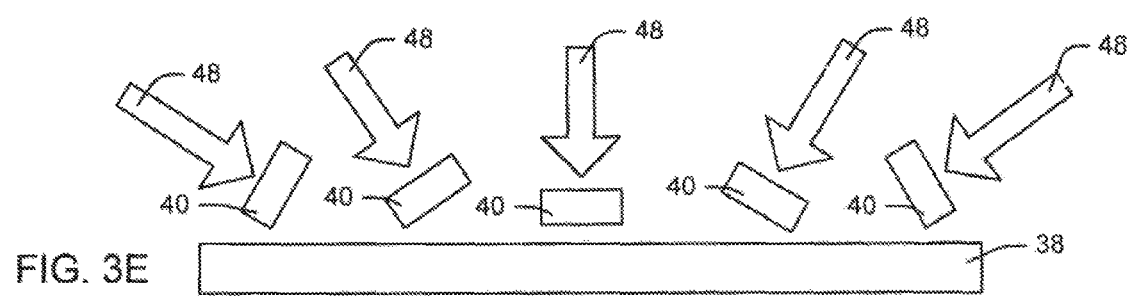
Figure 3X:
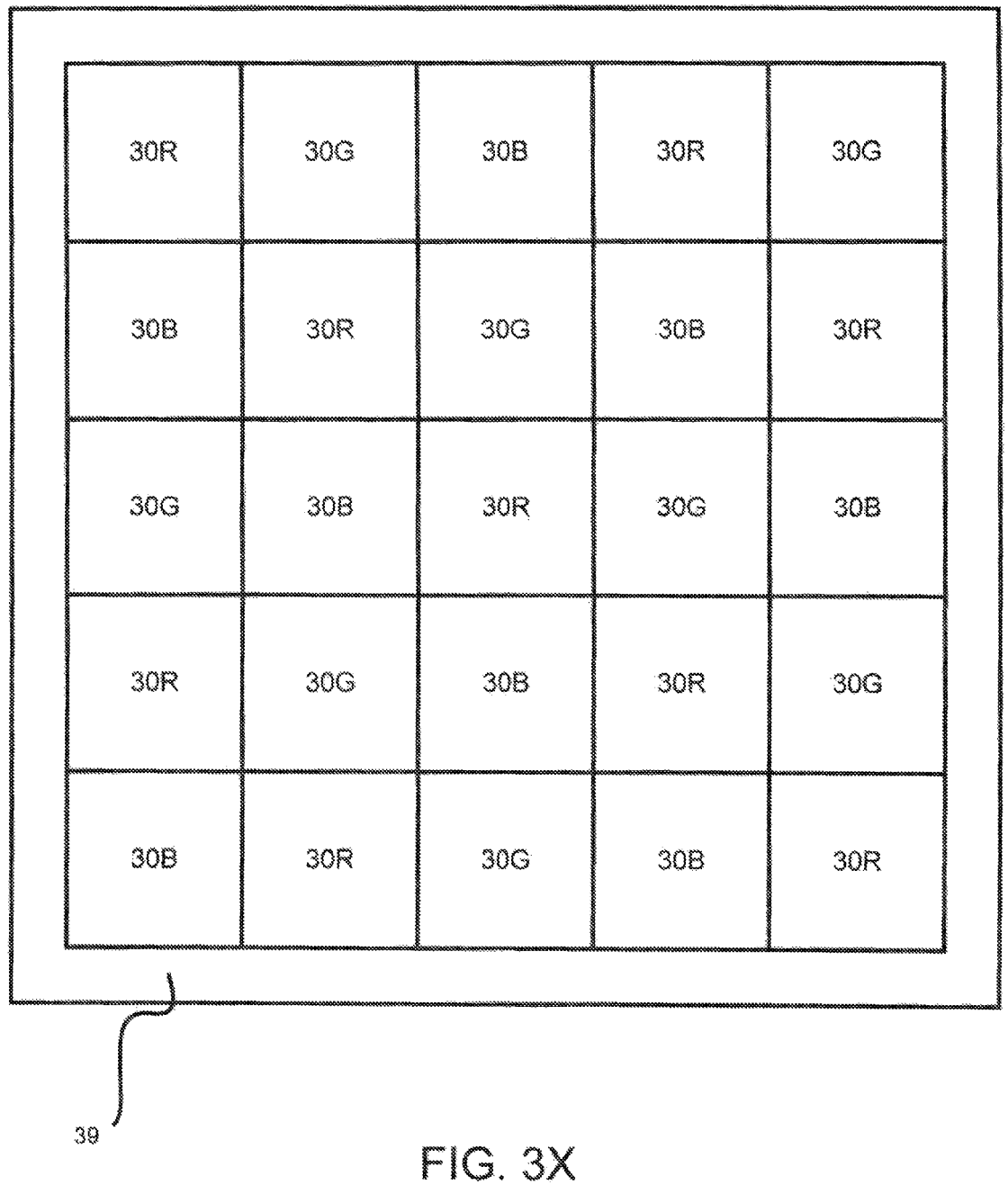
FIG. 3X is a schematic diagram depicting an array of light emitting semiconductor devices in a lighting system according to an embodiment of the present invention.
Figure 4:
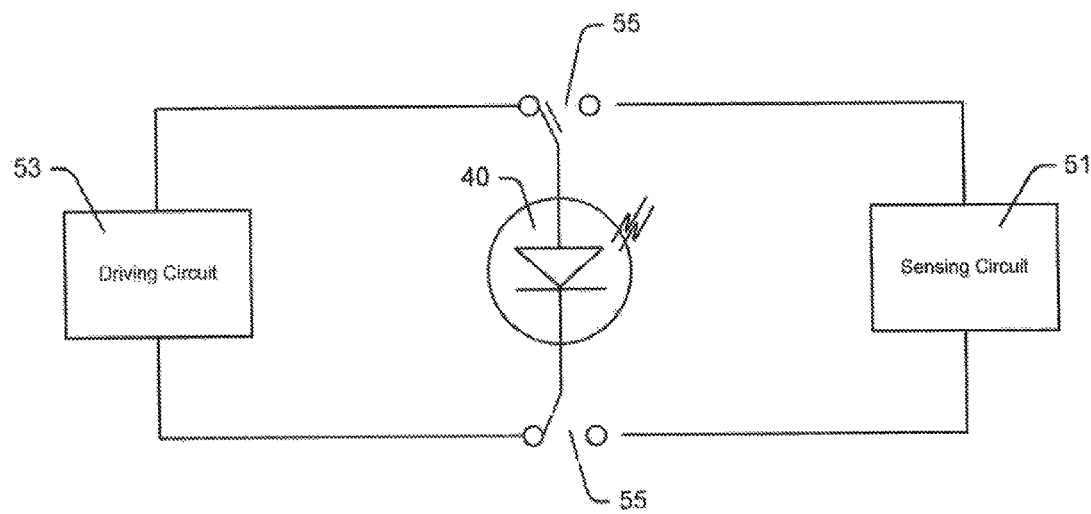
FIGS. 4 and 5 are schematic diagrams of embodiments of switching circuits of the lighting system according to an embodiment of the present invention.
Figure 5:
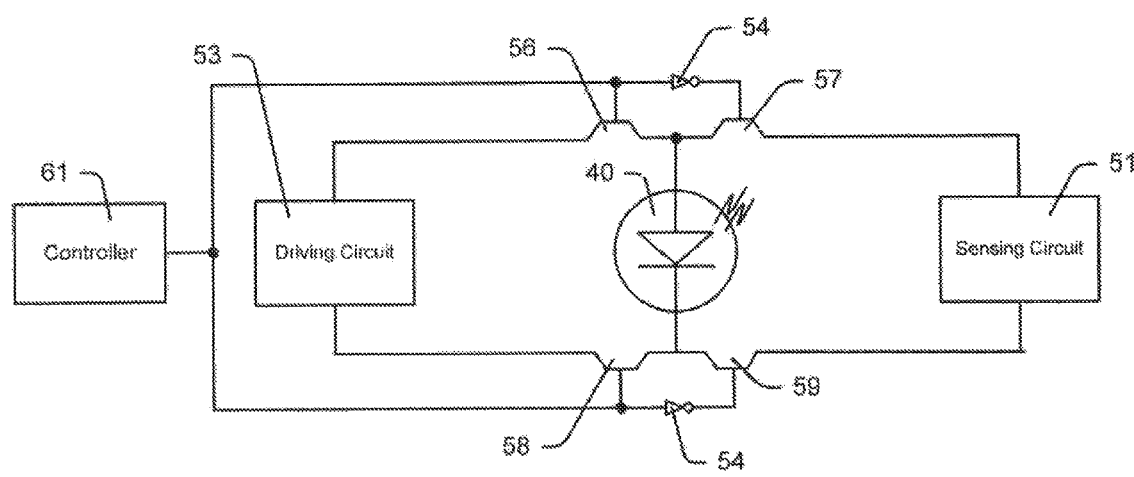
Figure 6:
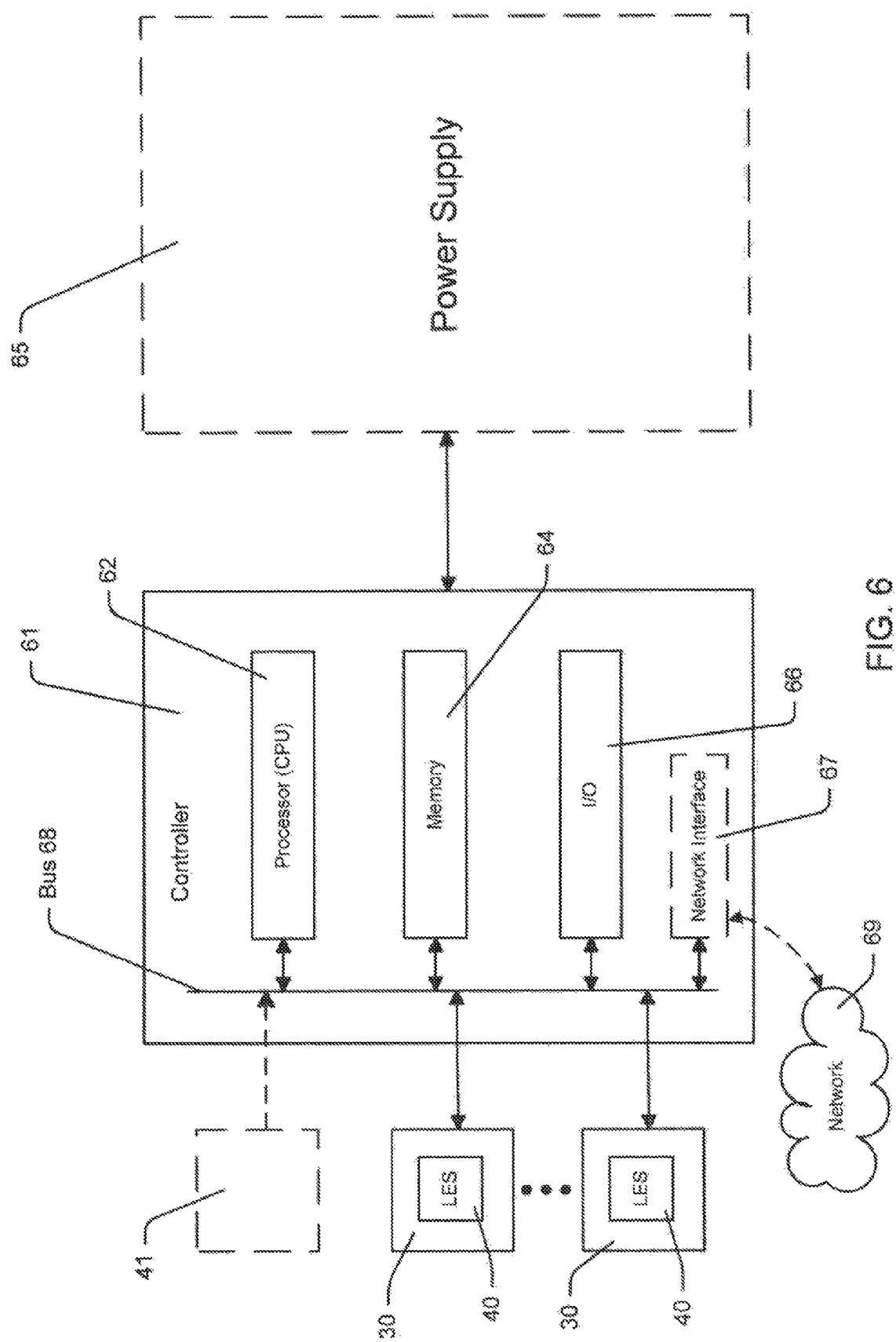
FIG. 6 is a schematic diagram of the lighting system according to an embodiment of the present invention showing a power supply.
Figure 7:
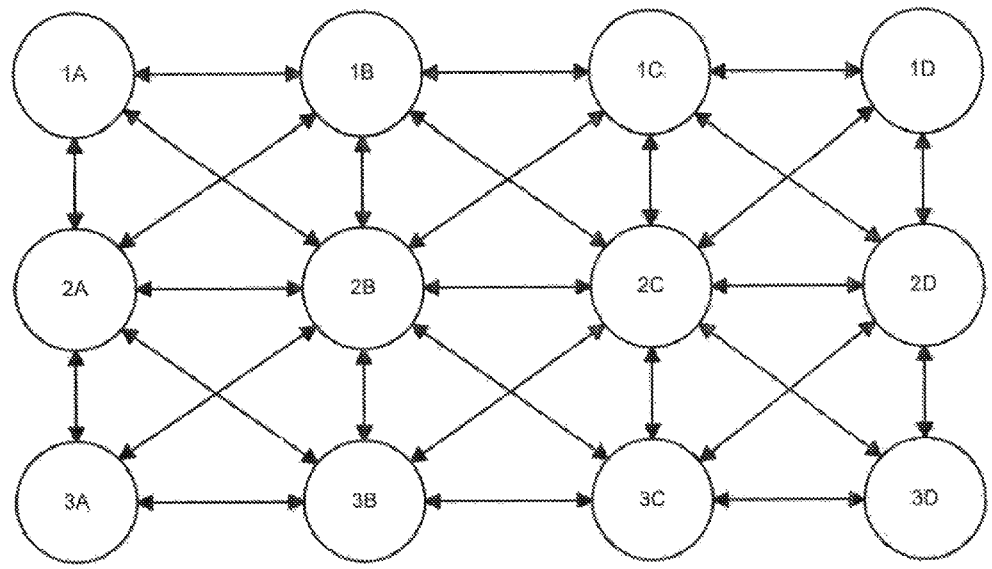
FIG. 7 is a schematic diagram illustrating an embodiment of a network of nodes in a lighting system according to an embodiment of the present invention.
Figure 8:
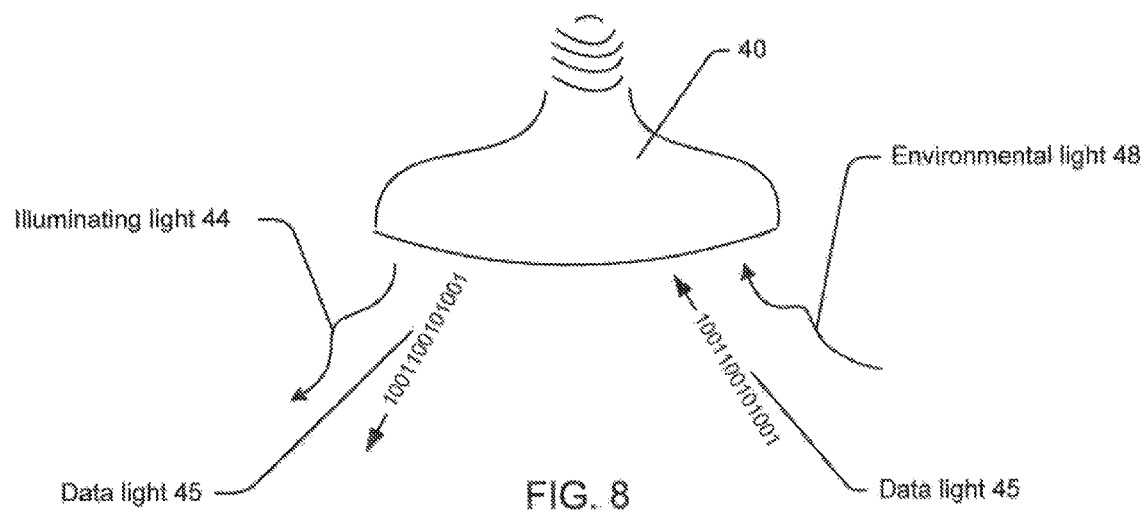
FIG. 8 is a perspective schematic diagram of a lighting device that may be included in the lighting system according to an embodiment of the present invention.
Figure 9:
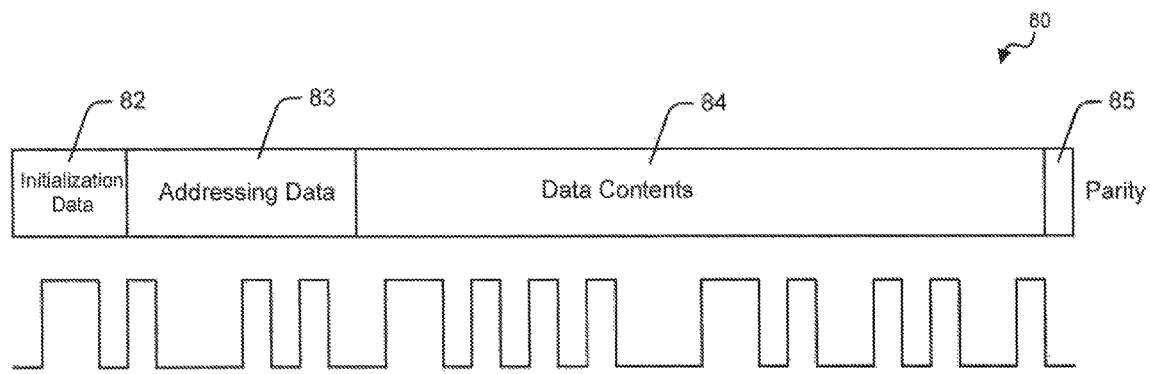
FIGS. 9-12 are schematic diagrams illustrating embodiments of data communication in the lighting system according to an embodiment of the present invention.
Figure 10:
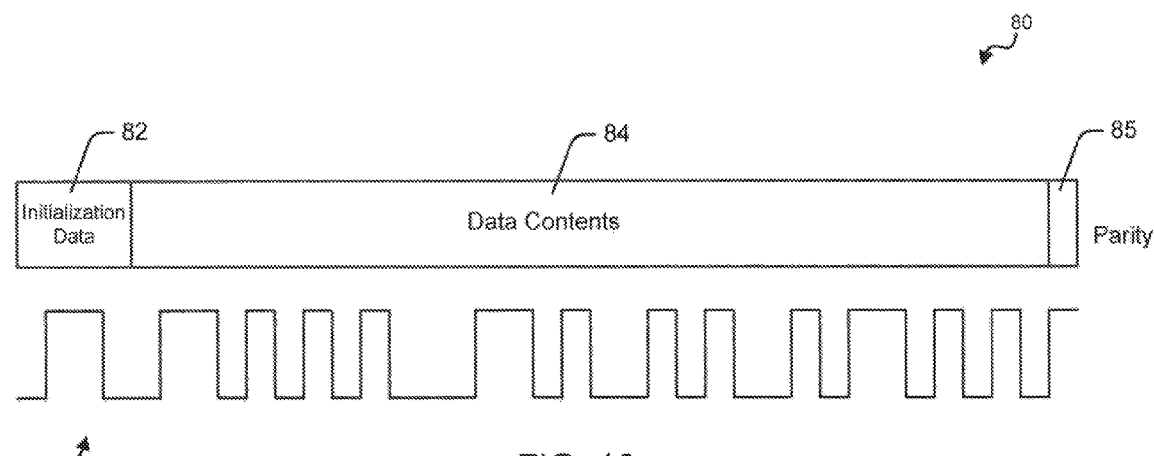
Figure 11:
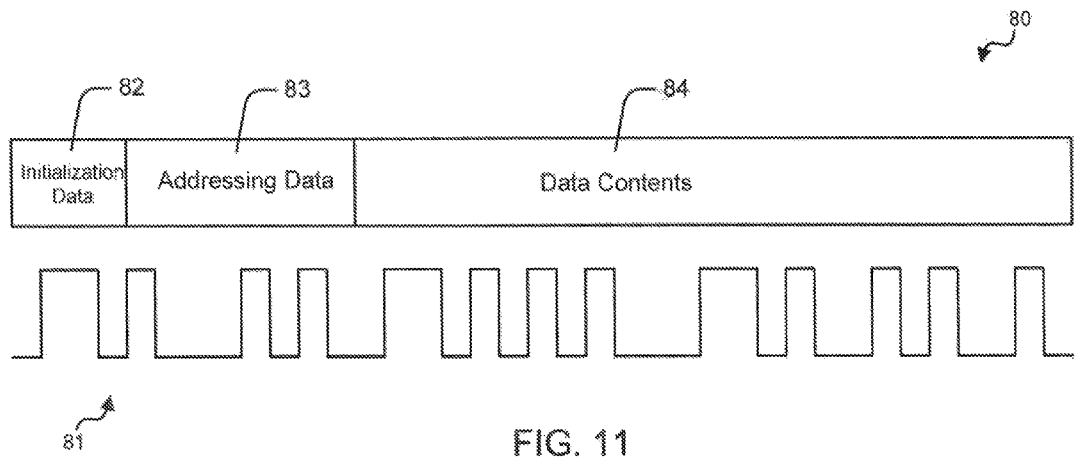
Figure 12:
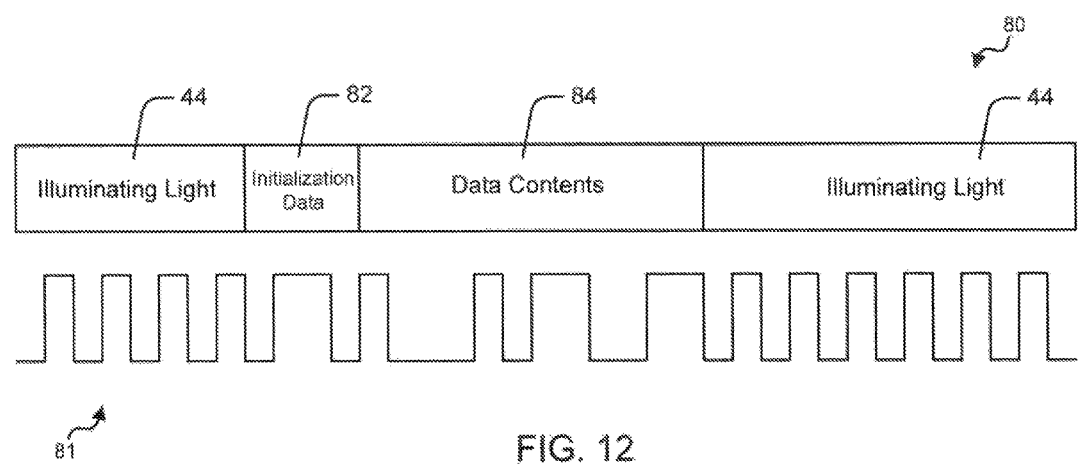
Figure 13:
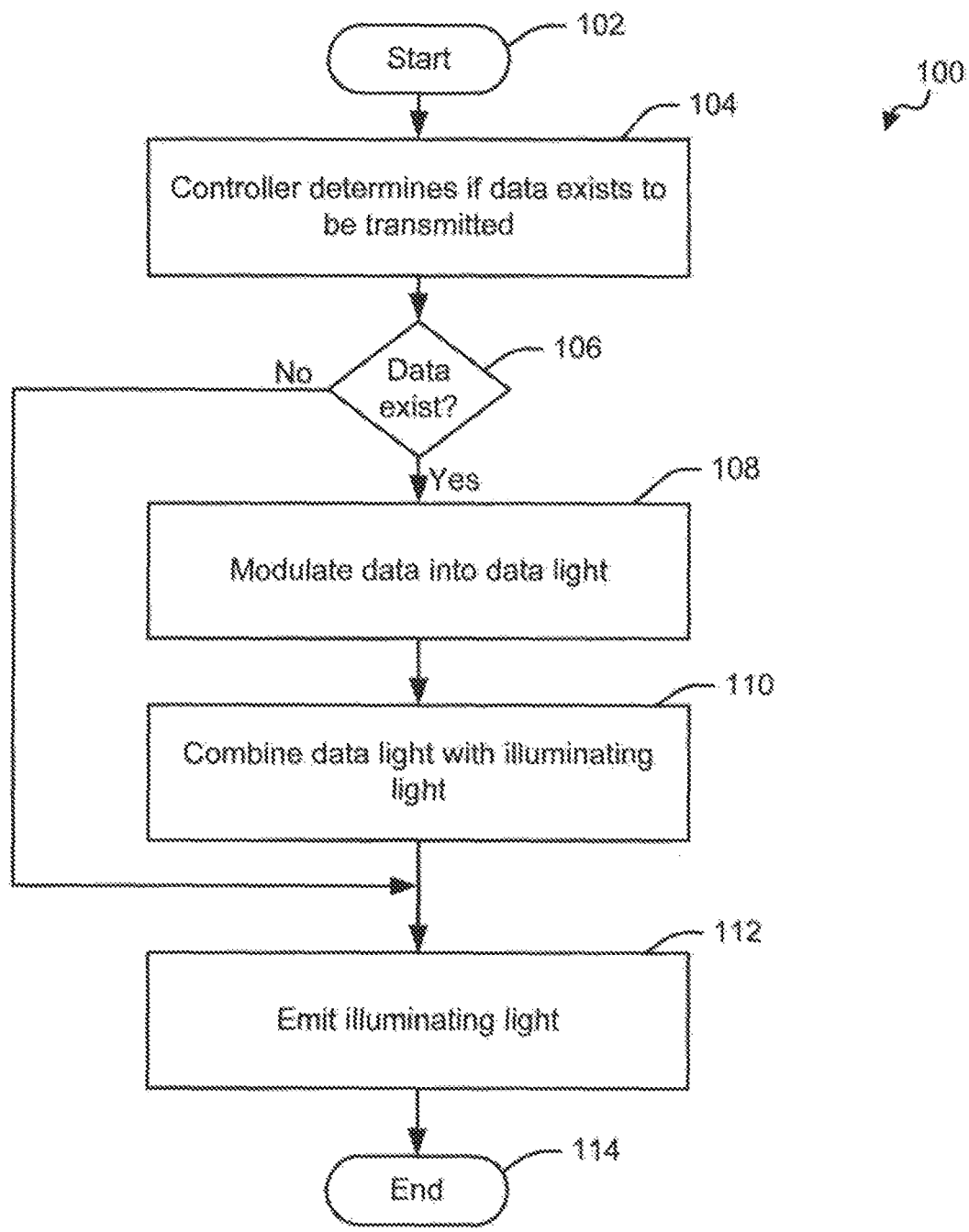
FIGS. 13-16 are flow charts illustrating method aspects of embodiments of the present invention.
Figure 14:
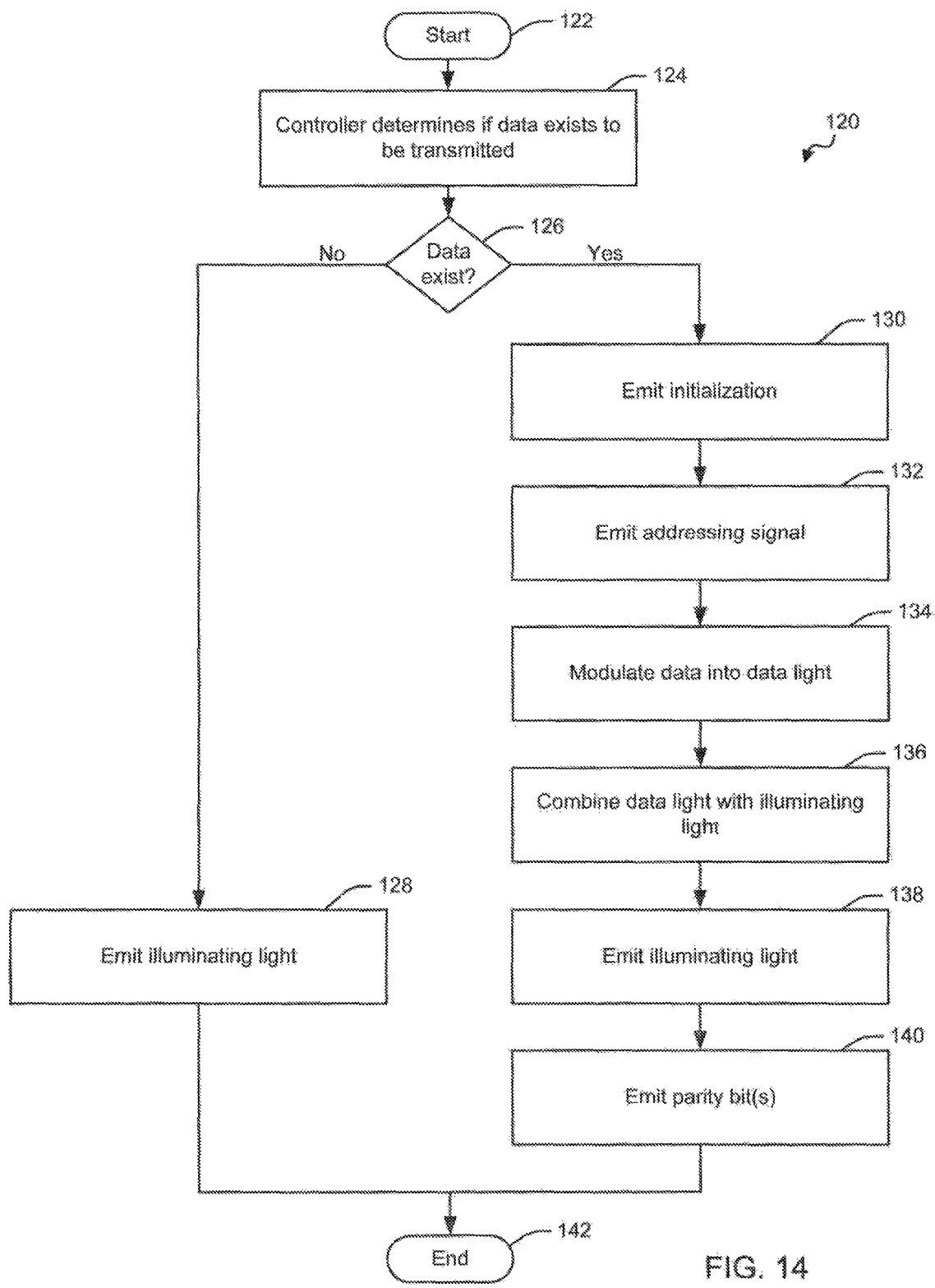
Figure 15:
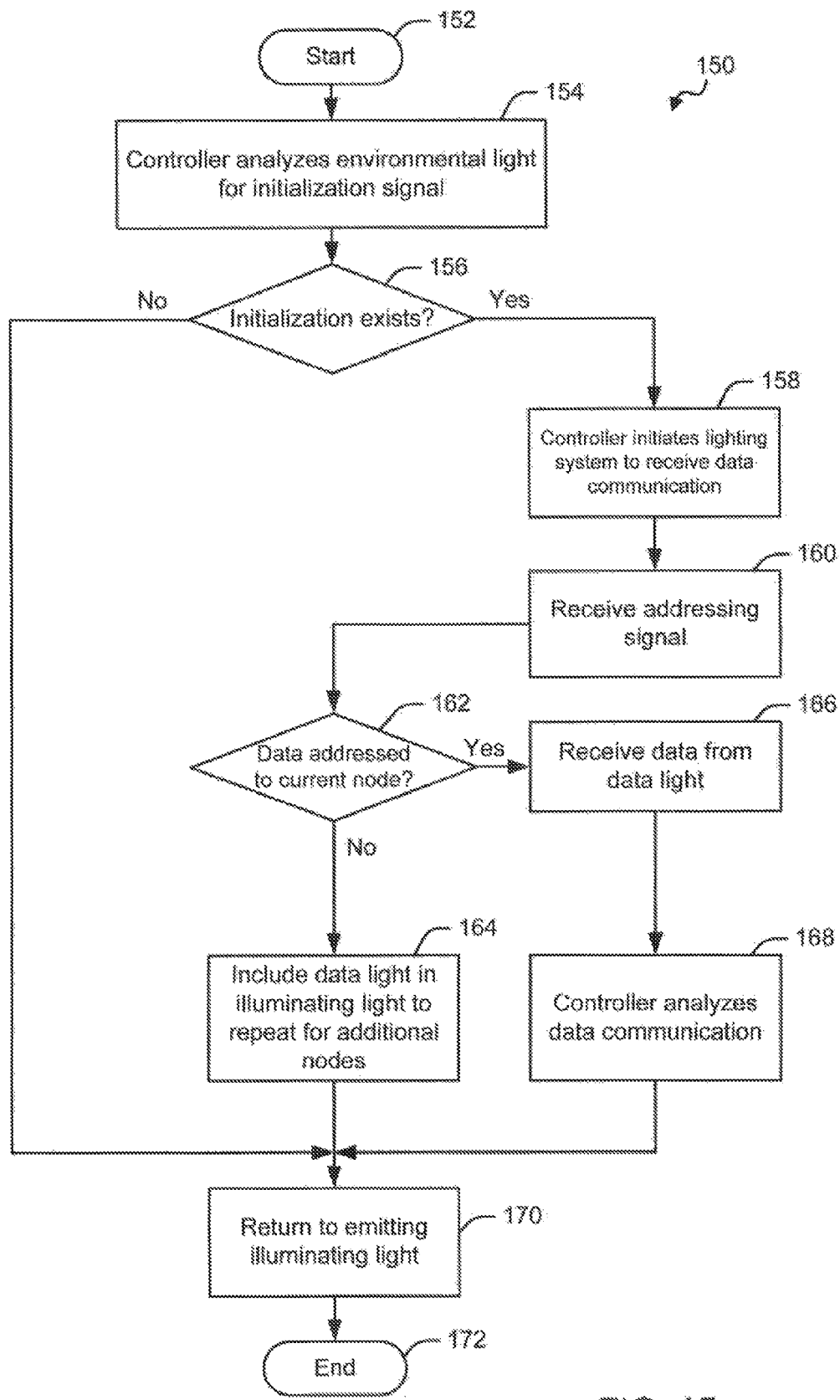
Figure 16:
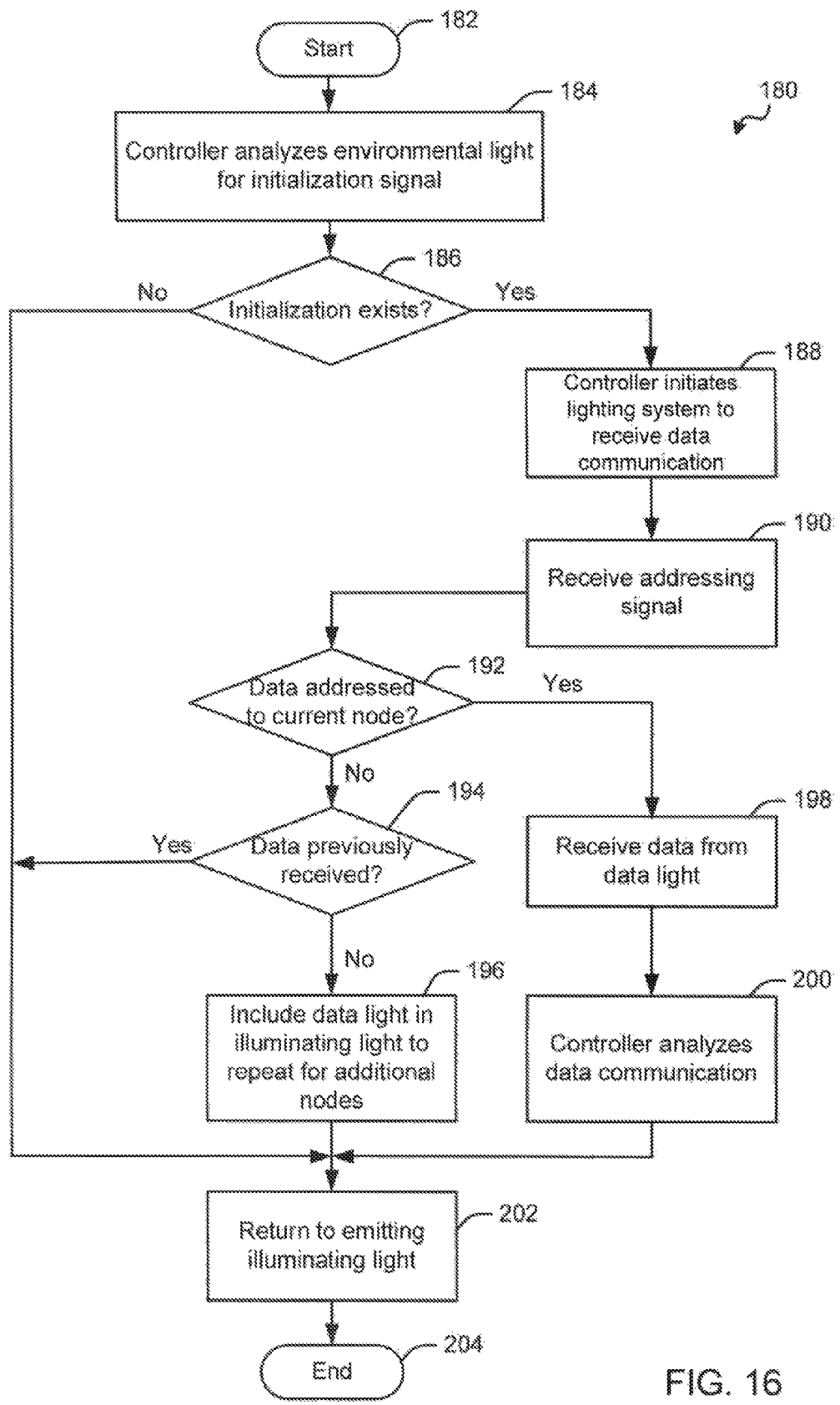
Figure 17:
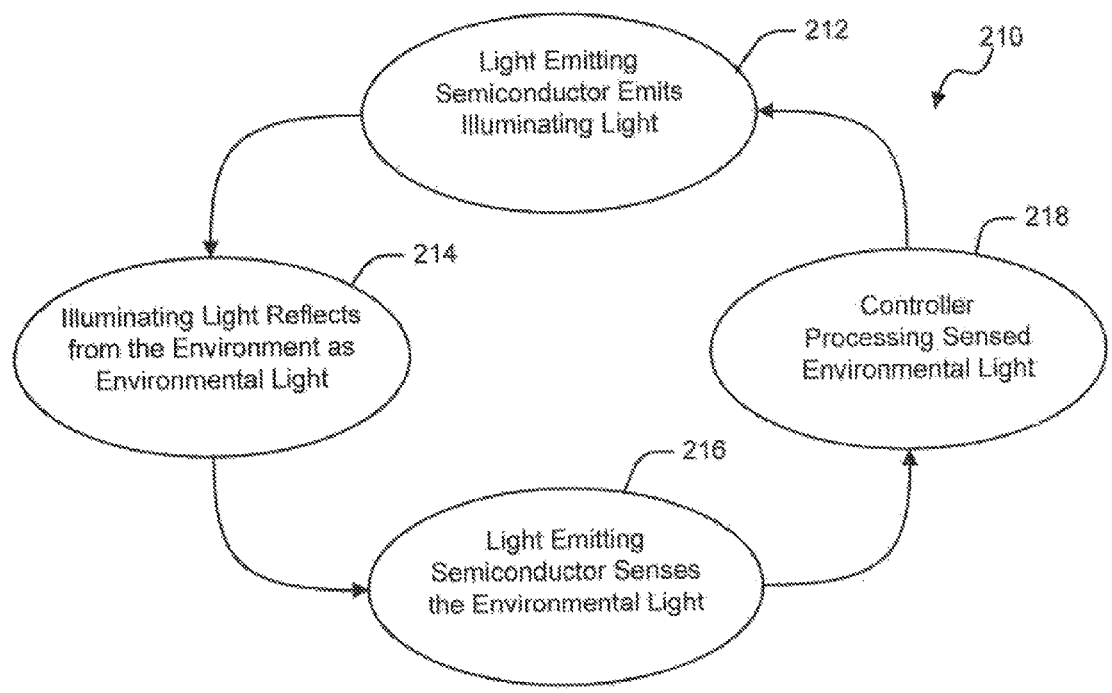
FIGS. 17-17B are state diagrams illustrating modulation cycles of a light emitting semiconductor device in the lighting system according to an embodiment of the present invention.
Figure 18:
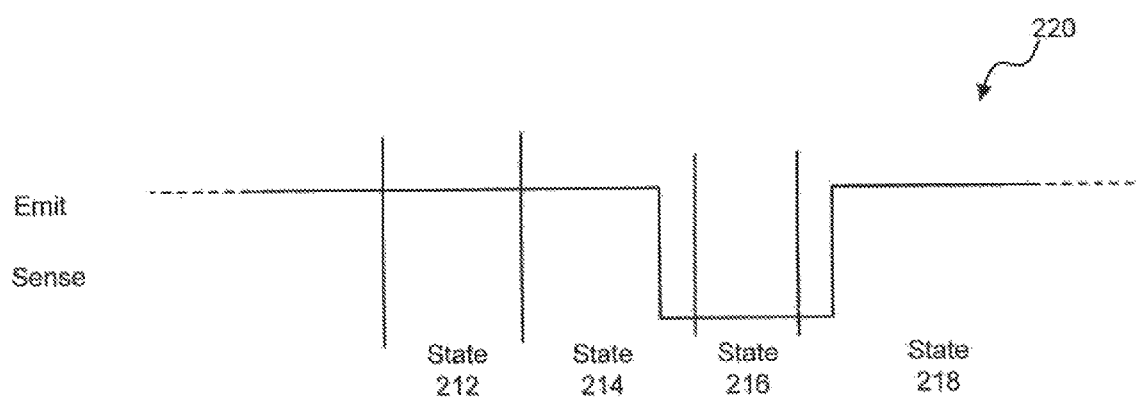
FIG. 18 is a timing diagram providing a graphical chart of switching the light emitting semiconductor device between the emitting operation and the sensing operation in the lighting system according to an embodiment of the present invention.
Figure 17B:
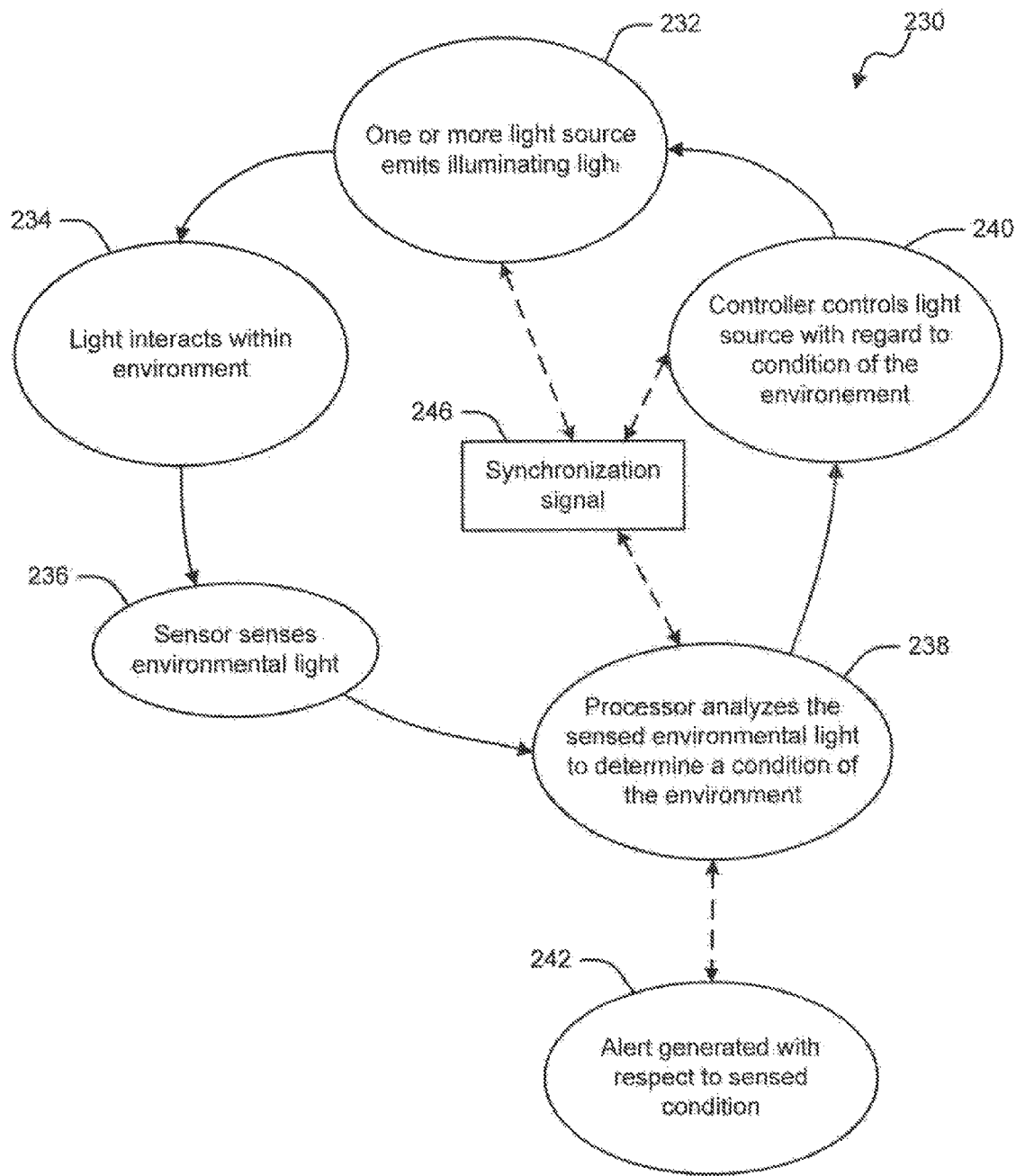
Figure 19:
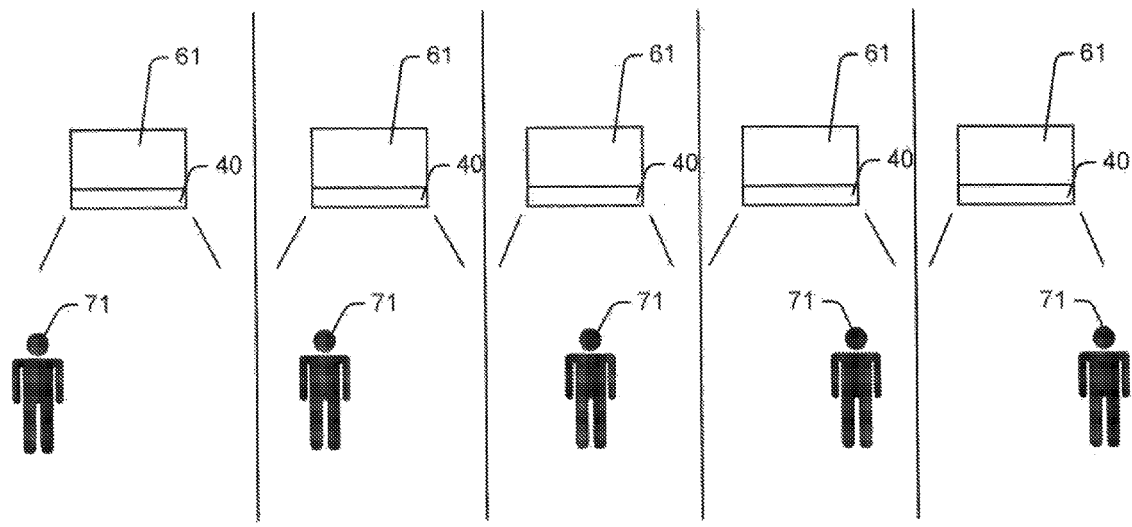
FIG. 19 is a chart illustrating a figure of events that may occur in an environment and sensed using the lighting system according to an embodiment of the present invention.
Figure 20:
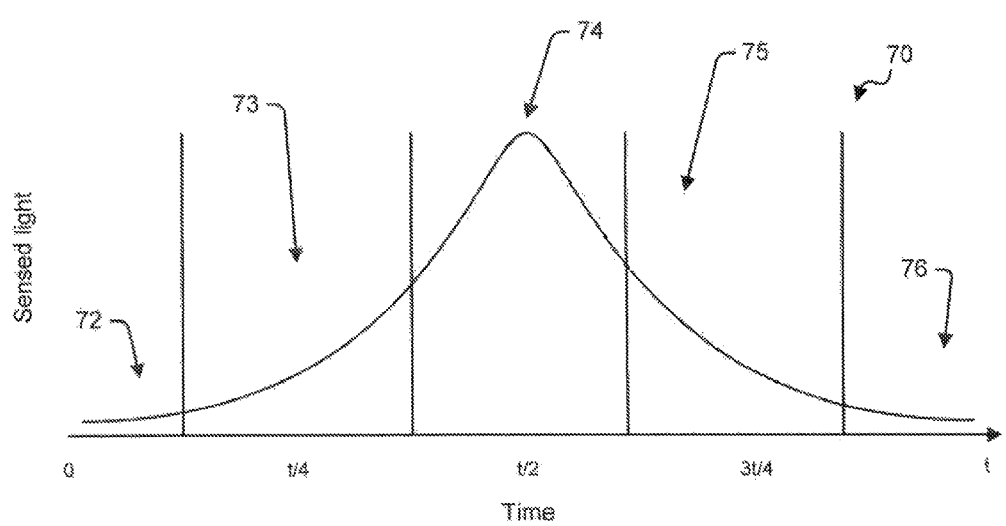
FIG. 20 is a chart illustrating relative intensity of environmental light sensed by the lighting system according to an embodiment of the present invention corresponding with time.
Figure 29:
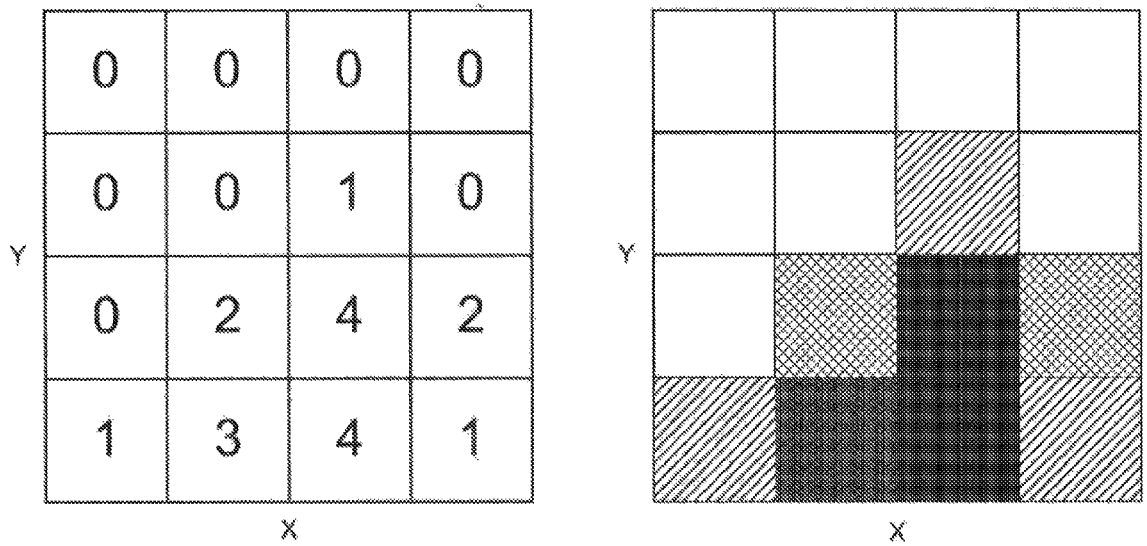
FIGS. 29-30 are schematic diagrams showing a correlation of data sensed in a data light using the lighting system according to an embodiment of the present invention to an image.
Figure 30:
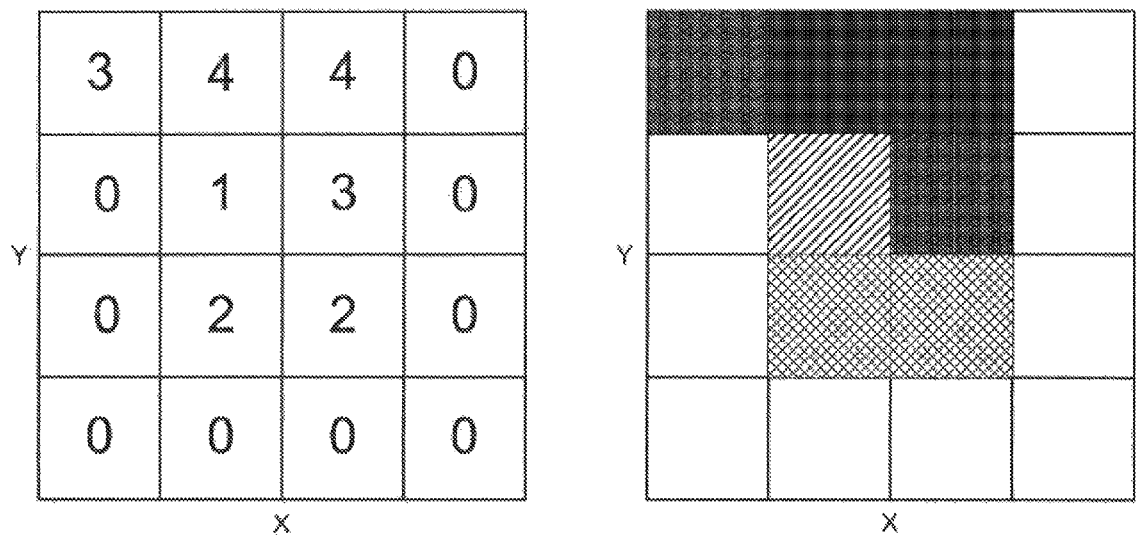

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of embodiments of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the embodiments of the present invention.

This application is related to U.S. patent application Ser. No. 13/269,222 titled "WAVELENGTH SENSING LIGHTING SYSTEM AND ASSOCIATED METHODS," the inventors of which include the inventors of the present application, on Oct. 7, 2011. The entire contents of the Ser. No. 13/269,222 application is hereby incorporated by reference. The information incorporated is to be considered as much a part of the present disclosure as if the text was repeated in the application, and should be treated as part of the text of the present disclosure. Accordingly, although FIGS. 1-30 are referenced in this application, no further discussion regarding these drawings and the patent reference numbers illustrated therein, are necessary.

Referring now additionally to FIGS. 31-56, a wavelength sensing lighting system 10, according to an embodiment of the present invention, is now described in greater detail. Throughout this disclosure, the wavelength sensing lighting system 10 may also be referred to as a lighting system 10, system, device, embodiment, or the invention. Alternate references to the wavelength sensing lighting system 10 in this disclosure are not meant to be limiting in any way. A person of skill in the art, after having the benefit of this disclosure, will appreciate that the present invention may include embodiments that perform total, partial, and minimal conversion of a source light 42 into a converted light 46. Additionally, skilled artisans will appreciate that, in embodiments with partial wavelength conversions, the remaining, unconverted source light 42 may be combined with the converted light 46 to be directed in the desired output direction, for example, to illuminate a space or to sense a condition in the environment.

Additionally, in the following disclosure, a light source is disclosed as a component of the lighting system 10, according to an embodiment of the present invention. The light source may be a light emitting semiconductor device 40, which may be referenced throughout the following disclosure. Additionally, a sensor may be discussed to sense environmental light 48. The sensor may be a light source, such as light emitting semiconductor device 40. The light emitting semiconductor device 40 may include, among other devices, a light emitting diode (LED). In embodiments of the present invention, the operation of the sensor may be performed by a light source, such as a light emitting semiconductor device 40. As a result, the light emitting semiconductor device 40 should be assumed to collectively include the light source and the sensor in at least one embodiment of the present invention.

Furthermore, in the following disclosure, a controller 61 may be discussed to analyze the environmental light 48 sensed by the sensor and control the emission of illuminating light 44 by the light source. The sensor and the light source may be a light emitting semiconductor device 40. The controller 61 may collectively include an analysis processor to analyze sensed environmental light 48 and a lighting controller 61 to control emitting illuminating light 44.

The controller 61 may be a computerized device capable of sending, receiving, and analyzing data and electronic signals. The controller 61 may control one or more light source, which may be included in an array 39. However, the functionality of the controller 61 should not be limited to light source controlling operations. The controller 61 may additionally accept and analyze data or electronic signals received from one or more sensor. The controller 61 may perform the operations of both an analysis processor and a lighting controller 61, among numerous other operations that would be apparent to those skilled in the art. Skilled artisans will additionally appreciate that the controller 61 may be described broadly herein as a computerized device to perform computational operations, including processing data.

Skilled artisans will appreciate additional embodiments of a light source, for example, and without limitation, electroluminescent, laser, incandescent, and fluorescent light sources. Although the light source may be discussed in regard to a specific embodiment of a light emitting semiconductor device 40, a person of skill in the art will appreciate that additional light sources may be included with the operation of the various embodiments of the present invention, are intended to be included within the scope of the same. As a result, skilled artisans should not view the use of a light emitting semiconductor device 40 through this disclosure as limiting the scope of the light source.

As previously discussed in the disclosure incorporated herein, a light emitting semiconductor device 40 may be used as a lighting device and/or sensor, which may emit illuminating light 44 and/or detect environmental light 48 from a plurality of directions. More specifically, and without limitation, an LED may be operable as a photodiode in replacement or addition to being a light emitter. LEDs are also capable of detecting incident light and producing an output voltage dependant on the intensity and the wavelength of such incident light. The lighting system 10, according to an embodiment of the present invention, may advantageously be implemented using an LED as a source of light emission and device for light detection, advantageously decreasing the complexity and manufacturing cost of the system 10.

The efficiency of a light emitting semiconductor device 40, such as an LED, operating as a light detecting sensor may not be as good as that achieved by a dedicated sensor, such as a photodiode or a phototransistor. However, light emitting semiconductor devices 40 can provide enough sensitivity to allow their use as photodetectors for a plurality of applications consistent with the scope of the present invention. Typically, if an LED is inserted into an electronic circuit that may normally accept a dedicated photodiode sensor, the LED may perform significantly the same operation as the dedicated photodiode. The LED may be switched between an emitting circuit, detecting circuit, and any other circuit, as it has been contemplated in accordance with an embodiment of the present invention. The LED, much like a typical photodiode, may be sensitive to a wavelength range that is equal or lesser than the light that would be emitted by the LED. In other words, an LED operating as a sensor may typically detect light comprised of wavelengths equal to and shorter than the wavelengths that could be emitted by the LED.

In one embodiment, sequential and temporally correlated PWM of individual LEDs of an array 39 may be operated in conjunction with temporally correlated sensing function to sense one or more condition of an environment. For example, in one embodiment, a single LED may be powered to emit illuminating light. Additional LEDs in the array 39 may be used for detection of environmental light 48 (e.g., during one or more duty cycles). In another embodiment; scanning along particular geometries of the array 39 can be used to resolve environmental signals, e.g., scanning along the vertical, horizontal; or diagonals of a rectangular or otherwise shaped array 39. Alternatively or additionally, multi-color detection of environmental light 48, including the use of metameric whites, can be used for greater resolution. Signal processing of the sensed data correlated with the illuminating light 44 is used to characterize the environment. Mathematical analysis and signal processing techniques including Fourier transforms may be used to analyze the data.

In another embodiment; optics may be applied to one or more light emitting semiconductor devices 40, or portions of light emitting semiconductor devices 40 included in the array 39 or across the network 69, to improve the resolution at which a condition of the environment is detected. The resolution may be improved by allowing one or more light emitting semiconductor device 40 to detect different regions of an illuminated space. For example, LEDs may illuminate and/or detect multiple directions substantially simultaneously.

Provided without the intent to limit the present invention, some examples of an LED, an illustrative type of light emitting semiconductor device 40, operating as a sensor will now be discussed. In a first example, an infrared LED may be included in a circuit as a photodiode. The infrared LED may emit illuminating light 44 with an approximate wavelength of 1400 nanometers. This may result in the infrared LED being usable as a photodetector to detect infrared light with wavelengths shorter than 1400 nanometers, visible light, and ultraviolet light. However, the illuminating light 44 emitted by the infrared LED may not be detected by a human without first being converted into visible light.

As another example, a blue LED may be included in a circuit as a photodiode. The blue LED may emit illuminating light 44 with an approximate wavelength of 460 nanometers. This illuminating light 44 may include high efficacy light which would be visible to humans. However, the blue LED may only be capable of detecting environmental light 48 with wavelengths shorter than 460 nanometers, which may include additional blue light and ultraviolet light, without performing some wavelength conversion operation on the environmental light 48 prior to detection.

A person of skill in the art will appreciate that one or more LEDs may be included in the array 39 to emit illuminating light 44 within an acceptable wavelength range, and detect environmental light 48 within an acceptable wavelength range. For example, an array 39 may include a plurality of blue LEDs and a plurality of infrared LEDs. The blue LEDs may emit an illuminating light 44 that may be detectable to humans. Additionally, the infrared LEDs may detect an environmental light 48 within the visible spectrum. In this example, infrared LEDs would be able to detect at least part of the light emitted by the blue LEDs.

In another example, one or more wavelength conversion material 30 may be located between the LED and the environment to convert the wavelength range of light. The wavelength conversion material 30 may perform a Stokes shift, wherein the conversion material 30 may absorb one or more photon, an elementary particle of light, from a source light 42. The absorbed photon may cause the conversion material 30 to enter an excited state. The conversion material 30 may then emit a photon, allowing the conversion material 30 to relax from the excited state as it emits converted light 46. The photon of the converted light emitted by the conversion material 30 during a Stokes shift may have less energy than the absorbed source light photon.

Another type of wavelength conversion material 30 may perform an anti-Stokes shift, wherein the conversion material 30 may emit a converted light 46 with higher energy, and thus shorter wavelengths, than the absorbed source light 42. The higher energy of the converted light 46 resulting from an anti-Stokes shift may result from the combining of two or more photons of a lower energy state to create one photon of a higher energy state. This process may be known generally to skilled artisans as photon upconversion. Additionally, the higher energy of the converted light 46 emitted by an anti-Stokes conversion material 30 may be due to dissipation of thermal phonons in a crystal lattice, as will be understood by a person of skill in the art.

A wavelength conversion material 30, as it is defined in regard to the present invention, may include one or more conversion materials. For example, without limitation, the wavelength conversion material 30 may include two types of phosphors to convert a blue source light into yellow and red converted lights. As an additional example, the conversion material 30 may include a first conversion material 30 to perform a Stokes shift and a second conversion material 30 to perform an anti-Stokes shift. For example, the first conversion material 30 may convert the blue light emitted by a blue LED into white light, which may be more visually pleasing to an observer. The second conversion material 30 may convert a source environmental light 48 into blue or ultraviolet light, which may be detected by the blue LED. By including both a Stokes and anti-Stokes conversion material 30, the LED may emit and detect light within a significant range of the visible spectrum with respect to the respective wavelength conversions. Also, with respect to the present example, a Stokes conversion of infrared light and an anti-Stokes conversion of blue light may be inconsequential to the operation, as the conversion may simply convert a portion of the source light 42 into converted light 46 outside of the visible spectrum.

Referring now to FIGS. 31-36, illustrative wavelength ranges will now be discussed in relation to the light emitted and detected by a light emitting semiconductor device 40, such as an LED. The following discussion will be directed to using an LED as the light emitting semiconductor device 40. However, a person of skill in the art will appreciate that additional light emitting semiconductor devices 40 may be included in the lighting system 10, according to an embodiment of the present invention, and without limitation. Additionally, the illustrative waveforms illustrated in FIGS. 31-34 contemplate the emission of illuminating light 44 and the detection of environmental light 48 without the use of a conversion material 30 to perform a wavelength conversion.

Referring now to the illustrative waveforms of FIGS. 31-32, the light emitted and detected by an infrared LED will now be discussed. FIG. 31 illustrates the illuminating light 44 that may be emitted by an illustrative infrared LED, which may include illuminating light 44 characterized by long wavelengths. The wavelength range of the illuminating light 44 emitted by the infrared LEDs may be outside of the visible spectrum. FIG. 32 illustrates the environmental light 48 may be detected by the infrared LED, which may include a wavelength range of environmental light 48 with wavelengths less than the illuminating light 44 emitted by the infrared LED. Since environmental light 48 in the visible spectrum would include light defined by wavelengths shorter than infrared light, the infrared LED may detect substantially the entire wavelength range of environmental light 48 in the visible spectrum.

Referring now to the illustrative waveforms of FIGS. 33-34, the light emitted and detected by a blue LED will now be discussed. FIG. 33 illustrates the illuminating light 44 that may be emitted by the blue LED, which may include illuminating light 44 characterized by relatively short wavelengths. The wavelength range of the illuminating light 44 emitted by the blue LEDs may be included in the visible spectrum, however toward the narrow wavelength range of visible light. FIG. 34 illustrates the environmental light 48 that may be detected by the blue LED, including a small wavelength range of visible light that may include environmental light 48 characterized by shorter wavelengths than the blue illuminating light 44 emitted by the blue LED. Since the blue LED may not detect wavelength longer than the blue light emitted by the blue LED, it may not be able to detect a significant wavelength range of environmental light 48 in the visible spectrum.

Referring now to FIGS. 35-36, the light emitted and detected by a blue LED that includes a conversion material 30 between the LED and the environment will now be discussed. More specifically, a blue LED with a conversion material 30 capable of performing a Stokes shift and an anti-Stokes shift, according to an embodiment of the present invention, will now be discussed. FIG. 35 illustrates the illuminating light 44 that may be emitted by the blue LED, which may include illuminating light 44 characterized by relatively short wavelengths. FIG. 35 additionally may include a wavelength range of illuminating light 44 that has been converted by the conversion material 30 to approximately the wavelength range of yellow light. Skilled artisans will appreciate that the blue source light 42 emitted by the blue LED and the yellow converted light 46 emitted by the conversion material 30 may be combined to create approximately white light.

Referring additionally to FIG. 34, the environmental light 48 that may be detected by the blue LED may include a small wavelength range of visible light, which may include environmental light 48 with wavelengths shorter than the blue illuminating light 44 emitted by the blue LED. However, the wavelength range of detectable environmental light 48 may additionally include environmental light 48 characterized by longer wavelengths than the light natively detectable by the blue LED.

The anti-Stokes conversion material 30 may convert the natively undetectable wavelengths of a environmental source light 42 into converted light 46 detectable by the blue LED. Since the blue LED may detect wavelengths shorter than its emittable blue light that, and since the conversion material 30 may convert the long wavelength light into short wavelength light, the blue LED may then be able to detect a significant wavelength range of the visible spectrum.

Referring now additionally to FIGS. 37-38, an illustrative conversion and detection of a wavelength range of environmental light 48 outside of the detectable spectrum of a blue LED will now be discussed. Skilled artisans will appreciate that the following discussion is provided as an example, in the interest of clarity, and without limitation. Skilled artisans will additionally appreciate that any number of LEDs, or other light emitting semiconductor devices 40, may be used in similar operation, and are intended to be included within the scope of the present invention. Therefore, those of skill in the art will not view embodiments of the present invention to be limited to the inclusion of blue LEDs.

Referring now to FIG. 37, a model environmental light 48 will now be discussed that includes a peak of light to be detected by the lighting system 10, according to an embodiment of the present invention. The aforementioned peak of environmental light 48 is indicated as the point 91. As illustrated in FIGS. 33 and 37, the blue LED may emit illuminating light 44 defined by a shorter wavelength range than the wavelength range of environmental light 48 indicated by point 91. Since the blue LED may not natively detect environmental light 48 with wavelengths longer than the light it emits, the blue LED may not be able to detect the peak of environmental light 48 indicated by point 91 of FIG. 37 without a prior wavelength conversion, such as an anti-Stokes conversion.

The wavelength range of environmental light 48 indicated by point 91 may be absorbed by a wavelength conversion material 30 as source light 42. The wavelength conversion material 30 may then emit a converted light 46 that includes at least part of the peak of light indicated by point 91, but characterized by a lower wavelength range than which the peak of light indicated by point 91 was absorbed by the conversion material 30. This shift of wavelengths is illustrated in FIG. 38. The converted peak of light indicated by point 91 may then be emitted by the conversion material 30 at with shorter wavelengths than the wavelength range of illuminating light 44 emittable by the blue LED, thus allowing the peak of light indicated by point 91 to be detected by the blue LED.

An array 39 of light sources and sensors may be comprised of light emitting semiconductor devices 40, which may perform the operation of the light source and the sensor. More specifically, and without limitation, the array 39 may include a plurality of LEDs configured to operate to emit illuminating light 44 and detect environmental light 48. The array 39 of LEDs may include one or more types of LEDs, configured to emit and detect different wavelength ranges of light. For example, the array 39 may include one or more of a blue LED, monochromatic LED, white LED, infrared LED, and any other light emitting semiconductor device 40. Each LED or other light source included in the array 39 may additionally have a wavelength conversion material 30 located between the respective light source and an environment. The wavelength conversion material 30 may convert the wavelengths of the light transmitted between the light emitting semiconductor device 40 and the environment. As a result, the array 39 may detect a plurality of discrete and/or overlapping wavelength ranges of environmental light 48, which may be analyzed by the controller 61 to determine a condition of the environment.

Additionally, the array 39 may include light sources and sensors, which may be light emitting semiconductor devices 40, in single- or multi-dimensional configurations. For example, an approximately linear length of light emitting semiconductor devices 40 may be included in a one-dimensional array. Additionally, a plane of light emitting semiconductor devices 40 may be included in a two-dimensional array. The plane of light emitting semiconductor devices 40 may be configured in, but not limited to, rectangular or circular arrays. Furthermore, three-dimensional array 39 may include light emitting semiconductor devices 40 located on different planes from one another in the array 39, which may emit illuminating light 44 and detect environmental light 48 from a plurality of directions. In one embodiment, a multi-dimensional array 39 may include a plurality of light emitting semiconductors devices 40 to emit illuminating light 44 in an outward direction, independent of one another. An example of this embodiment may include light emitting semiconductors being located on a surface of a spherical object and configured to emit light in a direction projecting outward from the center of the spherical object.

As another embodiment, the multi-dimensional array 39 may be configured to at least partially enclose a space. An example of this embodiment may include light emitting semiconductors being located on ceilings, walls, floors, and other points of a room. A person of skill in the art will appreciate additional configurations of multi-dimensional arrays 39 to be included in the scope and spirit of the present invention, after having the benefit of this disclosure.

The environmental light 48 detected by the LED, or other light emitting semiconductor device 40, may be communicated to a controller 61 or other signal processing device. A person of skill in the art will appreciate that the term controller 61, as it is defined herein, may describe a single controller 61 that may analyze the environmental light 48 sensed by the LED, light emitting semiconductor device 40, or other sensor, and control the emission of illuminating light 44 by the LED, light emitting semiconductor device 40, or other light source. Additionally, skilled artisans will appreciate an embodiment wherein the term controller 61 may include multiple controllers 61, such as an analysis processor to analyze sensed environmental light 48 and a lighting controller 61 to control emitting illuminating light 44. The analysis processor and the lighting controller 61 may be communicatively connected, and may optionally operate separately or as one monolithic unit.

In one embodiment, information generated by one or more photodetector, or other data comprising light detected by a sensor, may be received and processed by an analysis processor to generating information about the environment. In one embodiment, the processed data may be used to determine or infer information about the environment such as, but not limited to, object detection, location, motion, mass, direction, size, color, heat signature, or other information that may be associated with an object or the environment.

In another embodiment, environmental light 48 sensed by a photodetector or other sensor may be processed by an operatively connected controller 61 or processor 62. The data may be used to control one or more light sources to emit illuminating light 44, which may include data light 45 to be received by a sensor or photodetector. For example, if initial data is sensed by a first sensor, and analyzed by the controller 61 to indicate the presence of an object at a location in the environment, one or more light source may be modulated to confirm object detection, further resolve object features or location, or obtain additional data regarding the environment based on the data sensed by the sensor.

The lighting system 10, according to an embodiment of the present invention, may analyze one or more condition of the environment. For example, the lighting system 10 may analyze whether motion is present in the environment. As another example, the lighting system 10 may determine the luminosity of environmental light 48 included in the environment. The determination of luminosity may be performed generally across all sensed environmental light 48, or specifically with regard to one or more wavelength ranges of the environmental light 48. Additionally, the sensors of the lighting system 10 may be configured to detect the presence of environmental light 48 with a discrete wavelength, such as, for example 445 nanometers.

As previously mentioned, an array 39 may include a plurality of light emitting semiconductor devices 40, such as LEDs, configured to emit and detect light. Skilled artisans will appreciate the use of LEDs in this disclosure is not intended to limit the present invention to including solely LEDs as the light source and/or sensor. The LEDs included in the array 39 may be modulated between states wherein illuminating light 44 is and is not emitted. During the states wherein illuminating light 44 is not being emitted, the LED may be used to detect environmental light 48. The modulation of the LEDs may be controlled by the controller 61.

In one embodiment, the LEDs may be modulated between emitting and detecting light to allow detection of the light emitted by the same LED. This modulation may be performed by the controller 61. To detect its own light, an LED and its corresponding switching circuit would have to switch between emitting illuminating light 44 and detecting environmental light 48 in less time than it would take for the illuminating light 44 to be emitted, reflected from the environment, and detected by the.

Alternatively, one or more LED included in the array 39 may be configured to sense the light emitted by one or more other LED included in the array 39. The timing of the various LEDs included in the array 39 may be controlled by the controller 61. In one embodiment, two or more LEDs in the array 39 may be configured such that at least one LED may receive a desired wavelength range of environmental light 48, which may include light previously or simultaneously emitted by another LED in the array 39. Through matching the wavelength ranges of illuminating light 44 emitted by one LED in the array 39, and environmental light 48 detected by another LED in the array 39, the lighting system 10 may determine a condition of the environment. Additionally, a plurality of LEDs may be included in the array 39 and configured to detect the light reflected from the environment that may have originated from other LEDs in the array 39. As the number of LEDs in the array 39 may increase, the number of conditions detected in the environment may also increase.

Skilled artisans will appreciate that LEDs included in the array 39 may be configured to emit and detect light emitted by any number of additional LEDs in the array 39. In other words, the LEDs need not be paired to emit and detect the same light as one another. Additionally, multiple arrays 39 may be connected through a network 69, allowing one array 39 to detect the light emitted by another array 39. The data relating to the light detected by another array 39 may be intercommunicated between the emitting and detecting arrays across the network 69.

The environmental light 48 detected by the sensors of the array 39 may be transmitted to a controller 61 as data. The controller 61 may concatenate the data to create an image. The resolution of the image detected by the array 39 may be determined relative to the number of points in the environment from which environmental light 48 is detected. For example, a simple one-dimensional array 39 including five forward-facing, linearly-aligned LEDs may be capable of producing an image with a resolution of one pixel by five pixels.

In some embodiments, a higher resolution image may be desired. A high resolution image may be produced, for example, by increasing the number of pixels to be included in the image. Due to the small scale at which semiconductor devices may be produced, a substantial number of light emitting semiconductors may be included in the array 39 to additionally sense environmental light 48 from a plurality of directions, effectively increasing the resolution of the respective image.

Adding additional sensors, such as LEDs, to the array 39 may increase the number of points in the environment to be detected by the array 39. Alternatively, including the sensors on a piezoelectric substrate, which is intended to generally include a plurality of deformable substrate types, may increase the points of an environment that may be sampled by a sensor. By allowing each sensor to detect environmental light 48 from multiple points in an environment, the size requirement of an array 39 needed to detect conditions of an environment with high resolution may be advantageously reduced. Additionally, including a large number of LEDs located on piezoelectric substrates in an array 39 may provide detection of conditions of an environment with increased resolution over sensors located on a fixed substrate.

The array 39 may be connected to, and intercommunicate with, additional arrays 39 as nodes in a network 69. The environmental light 48 sensed by each sensor in the node and analyzed by the controller 61 of the node, may be intercommunicated between the nodes throughout the network 69. By including a plurality of nodes in the network 69, the data detected by each node can be concatenated with data detected from other nodes to increase the resolution at which a condition of the environment with may be determined over the resolution available from a single node. The increased resolution of the environmental light 48 detected at each node may be collectively concatenated to produce a visual representation of one or more condition of the environment.

Where two or more nodes and/or arrays 39 are included in the lighting system 10, the driving time of one node or array 39 may be coordinated with the driving and/or detecting time of another node in the network 69. An example of a driving time may be the PWM timing and phase protocol for driving an array 39 or node for emitting illuminating light 44 and/or detecting environmental light 48. The coordination of this operation may be controlled by a controller 61 communicatively connected to the array 39, light emitting semiconductor device 40, or otherwise included in the node. The coordination may be used to control both emission and detection of light.

An example of visually detecting a condition of the environment will now be discussed. A two-dimensional visual representation of a condition of the environment may be an image. The image may be formed by concatenating the luminosity and/or wavelength data gathered from each point in the environment. Moreover, a plurality of images may be concatenated to create a moving picture, or video, of the environment. The video may be streamed directly to an interface device by transmitting data light 45 and/or using a data transmission protocol known within the art. The video may also be stored in memory 64, wherein it may be accessed, downloaded, and/or viewed concurrent or at a later time.

The images created from the sensed environmental light 48 may also be compared with previously or subsequently created images. For example, sequential images may be compared to detect differences between each image. The difference between the images may be analyzed to detect a condition, such as motion. Additionally, the controller 61 may further analyze the motion detected between a plurality of images to detect the distance and/or velocity of the motion. A person of skill in the art will appreciate that velocity is defined to include the rate and direction in which the position of an object may change. Skilled artisans will also appreciate that the images compared to detect motion, or another condition of the environment, may not be sequential.

The lighting system 10, according to an embodiment of the present invention, may detect the distance between the system 10 and an object in the environment. In one embodiment, the lighting system 10 may tag or indicate light emitted from the light source as marker light 49, which may be detectable by a sensor. The light source and the sensor may, for example, and without limitation, be an LED. Also, the light indicated as marker light 49 may be viewed as a segment of light that includes an identifying characteristic.

Skilled artisans will appreciate that the marker light 49 may be included in illuminating light 44 emitted into the environment and environmental light 48 sensed from the environment. The illuminating light 44 that includes the marker light 49 may be reflected from a point of reflection 50 in the environment, after which it may be received as environmental light 48 by a sensor, such as an LED configured to detect environmental light 48.

In one example, the marker light 49 may include a specific wavelength range as the identifying characteristic. As a specific example, and without limitation, a pulse of marker light 49 may be emitted by an LED into the environment with a wavelength of 485 nanometers. The marker light 49 may be natively emitted or converted by a conversion material 30 to achieve the desired wavelength range that may indicate the marker light 49. An LED operating to detect environmental light 48 may subsequently sense the pulse of marker light 49.

In an additional example, the marker light 49 may include one or more bits of digitally encoded information. This information may identify the segment of marker light 49. The digitally encoded marker light 49 may include a pattern of high and low values, such as zeros and ones, which may be sensed by a sensor and communicated to a controller 61. The digitally encoded marker light 49 sensed in the environmental light 48 may then be compared with the digital encoding of the emitted marker light 49 to determine whether the digitally encoded signal is the same.

The controller 61 may be connected to both the emitting LED and the sensing LED. The controller 61 may detect the delay between the emission of the marker light 49 and the detection of the marker light 49. The controller 61 may analyze the delay to determine the relative distance of an object in the environment.

In some instances, at least one LED may detect the marker light 49 as it is being emitted by another LED included in the lighting system 10, which may be communicated to the controller 61, which may create an error by having effectively having approximately no delay. The controller 61 may perform error detection by determining that the detection of marker light 49 without an accompanying delay may not have been reflected from a point of reflection 50 in the environment. In these instances, the controller 61 may disregard the sensed marker light 49 without an accompanying delay. The controller 61 may then subsequently detect the marker light 49 with an accompanying delay. This delay may be indicative that the marker light 49 has been reflected from a point of reflection 50, which may be due to an object in the environment.

Figure 39:
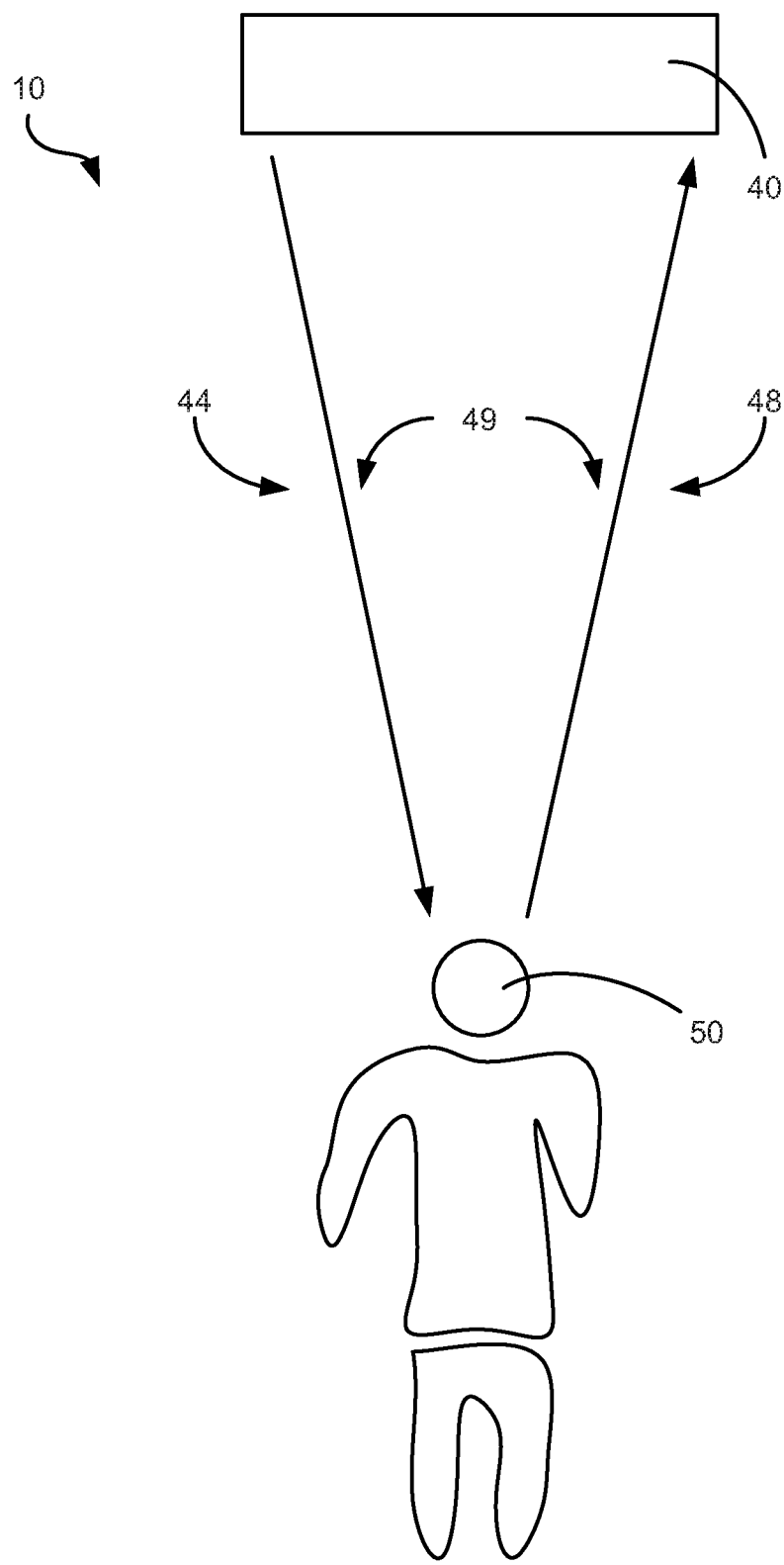
FIG. 39 is a block diagram of detecting an object in an environment, according to an embodiment of the present invention.
Figure 40:
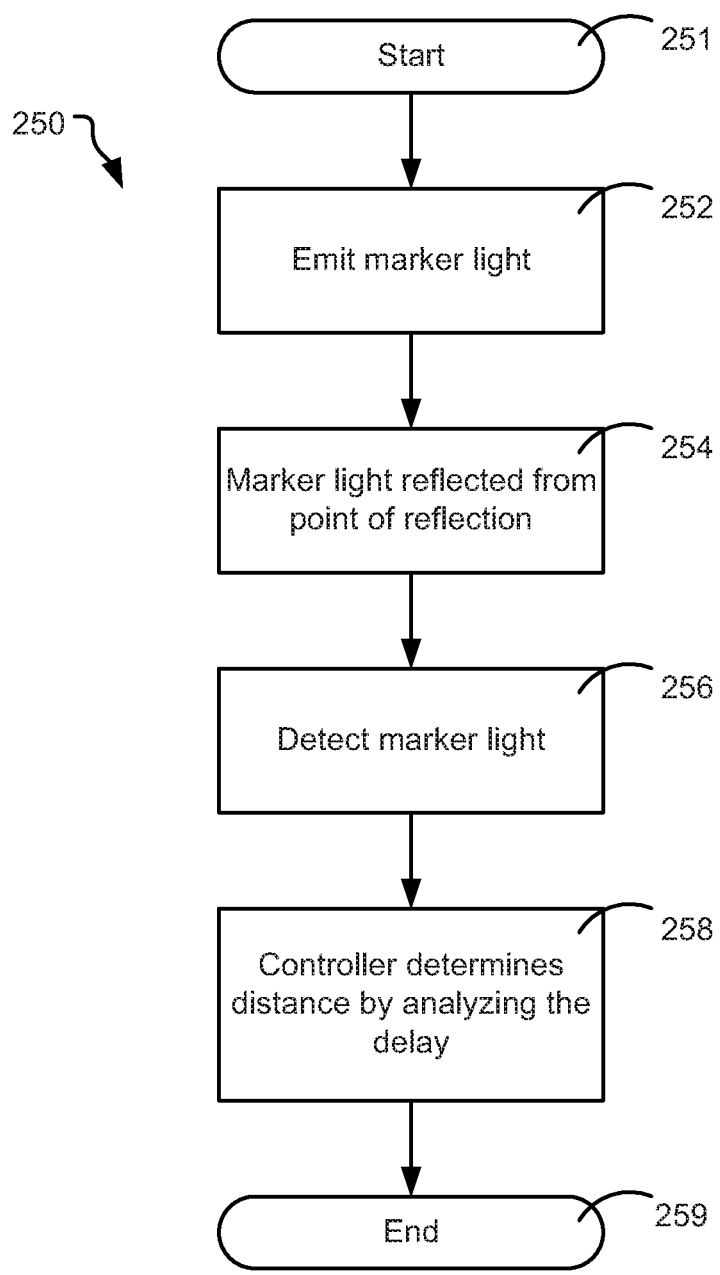
FIG. 40 is a flowchart illustrating the operation of FIG. 39, according to an embodiment of the present invention.
Figure 41:
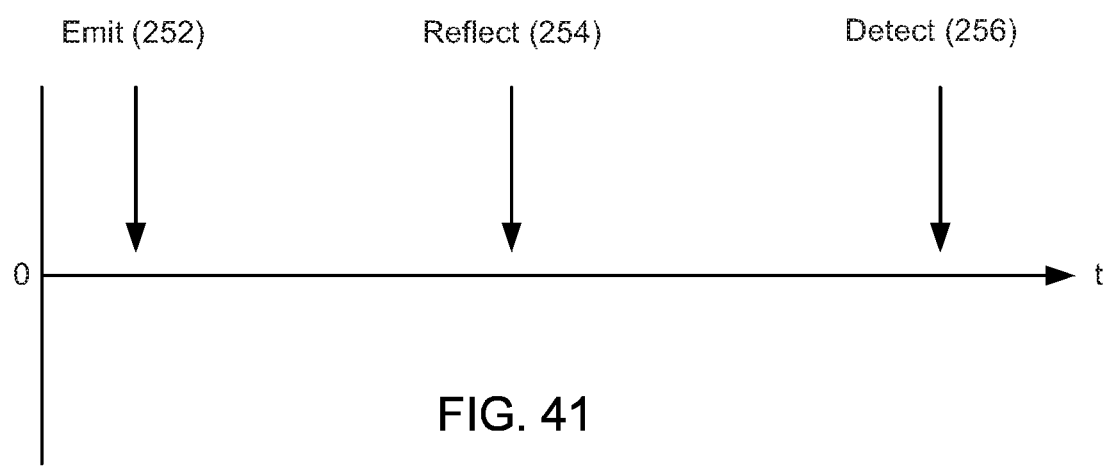
FIG. 41 is a time line relating to the events of the flowchart of FIG. 39, according to an embodiment of the present invention.

Referring now to FIGS. 39-41, an illustrative operation of detecting a delay using marker light 49 will now be discussed. The block diagram of FIG. 39 and the flow chart 250 of FIG. 40, along with the timeline of FIG. 41, illustrate the operations of flowchart 250 plotted relative to the time of each operation. Starting at Block 251, the delay detecting operation may begin. The marker light 49 may be emitted by light emitting semiconductor device 40, which may be included in an array 39 of light emitting semiconductor devices 40 (Block 252). The marker light 49 may then be reflected from a point of reflection 50 (Block 254). At least part of the reflected marker light 49 may be directed back to the light emitting semiconductor device 40, or array 39 of light emitting semiconductor devices 40, which may detect the light. Additionally, the reflected marker light 49 may be directed to another light emitting semiconductor device 40 included in a network 69 connected node, which may intercommunicate with the node that emitted the marker light 49. The reflected marker light 49 may be included in environmental light 48, which may be sensed by a light emitting semiconductor device 40 (Block 256). The controller 61 may then determine the distance of the object from the lighting system 10 by analyzing the delay (Block 258). The operation may then terminate at Block 259.

As an additional example, in a three-dimensional array 39, the environmental light 48 detected by the sensors of the array 39, or alternatively the sensors included within a node of the network 69, to determine a three-dimensional representation of the environment. The distance of an object detected by sensors included in the array 39 or network 69 may be concatenated to generate a three-dimensional model of the environment. As distances may be calculated from different angles, detail may be added to the three-dimensional model of the environment. Also, the three-dimensional model of the environment may be continually updated as the sensors continue to sample the environment. Like with images and videos, the three-dimensional model of the environment may be observed remotely by additional devices in the network 69.

After the environmental light 48 has been sensed by at least one sensor, which may be an LED included in an array 39, the lighting system 10 may analyze the environmental light 48. A number of signal processing operations have been discussed in the referenced and incorporated U.S. patent application Ser. No. 13/269,222. Additional signal processing operations may be included to recognize one or more pattern relative to the environment.

The data detected and analyzed from a single light emitting semiconductor device 40, a plurality of light emitting semiconductor devices 40 included in an array 39, or a plurality of light emitting semiconductor devices 40 connected through a network 69, can be further processed to extract additional information. Wavelength and intensity information may be distributed throughout a digital neural network for an in-depth analysis and identification of a source of interest. A neural network will be discussed in more detail below.

The controller 61 may analyze the data detected by the sensor, which may be an LED, to identify one or more condition of the environment. A condition of the environment may include objects, substances, or living beings in the environment. In an embodiment, identification may include recognition of one or more object, such as, but not limited to, large vehicle, small vehicle, people, a specific person, animal, substance and other conditions of an environment that could be identified.

The light emitting semiconductor device 40, or another sensor, may sense environmental light 48 including a plurality of wavelength ranges. A dominant wavelength may be included in the wavelength sensed by the lighting system 10. The dominant wavelength may be indicative of a desired condition to be detected in the environment, such as, for example, color. The dominant wavelength may additionally be used to sense the presence of a substance in an environment, as the controller 61 may detect the presence or absence of the dominant wavelength from the sensed environmental light 48.

In an embodiment of the present invention, the dominant wavelength may be defined by the controller 61. The controller 61 may be programmed to detect dominant wavelengths that can be associated with a specific condition to be sensed in the environment. The sensed condition may include the presence of a substance, for example, and without limitation, a gas, biological agent, explosive compound, neurotoxin, element, chemical composition, smog, particulate, or other substance. A person of skill in the art will appreciate additional conditions that may be sensed by detecting the presence or absence of a dominant wavelength, which is intended to be included within the scope of the present invention.

An object may be recognized or identified with various levels of clarity and resolution. For example, in an embodiment that includes a neural network, the resolution of an identified object may be relative to the amount and quality of the information provided to the neural network. A network of many nodes, each node including a controller 61, light source, and sensor, may provide enough resolution to allow for the identification of a person with a medium degree of confidence (80% or above), or a high degree of confidence (95% of above).

An artificial neural network, commonly referred within the art, simply as a neural network, may include a plurality of interconnected nodes to share the collection and processing of data. Each node in a neural network may operate similar to the neurons of a biological neural network, processing information using an interconnected network of simple units. The neural network may use a learning procedure, such as parallel distributed processing, to improve the accuracy of the analysis performed by at least one of the nodes included in the network 69. A person of skill in the art will appreciate additional learning procedures, in substitution or addition to parallel distributed processing, to be included within the scope of the present invention. Additionally, skilled artisans will appreciate additional artificial learning procedures that may analyze a determination to improve the accuracy of subsequent determinations to be included within the scope of the present invention, such as but not limited to, machine learning.

The choice of the neural network for recognizing and identifying an object may be based upon the configuration of the network 69 of nodes, each of which may include a controller 61 and at least one light emitting semiconductor device 40, for example, an LED. The selection process for selecting a type of neural network may begin with a detailed analysis of a certain number of input data streams for LEDs relating to the sensed environmental light 48. The neural network may then focus on determining correlations of LED responses with exposure to their respective light sources. LEDs spaced relatively far apart from each other will likely exhibit low correlation among different LEDs. Conversely, LEDs placed in an array 39 very close to each other may show high correlation numbers. The objective is to find the LEDs with the largest responses and correlations to enable achieving the highest performance in any subsequent neural network.

To operate effectively, a neural network may be trained to recognize different objects. More specifically, a neural network may be trained to identify one object from another of similar, but not identical, characteristics. The training may be performed using various techniques, such as, for example, use of back propagation of gradient-descent computed error corrections for weights and biases. The back propagation technique may involve feed forwarding an input training pattern, computing the associated error between computed outputs and training vector outputs, back propagating the associated errors, and adjusting weights and biases.

In an additional embodiment, machine learning may be used to improve the accuracy of the analysis performed by the controller 61. As will be understood by skilled artisans, machine learning may include a series of analyses performed by a computerized device, such as the controller 61, which may allow the computerized device to evolve its predictions based on empirical data included in memory 64 or detected by sensors. In embodiments of the present invention, the controller 61 of the lighting system 10, or collectively the controllers 61 of each node included in the lighting system 10, may included as the computerized devices to analyze the environmental light 48 data detected by one or more sensor.

The controller 61 may make predictive determinations based on rules that have been dynamically created through data programmed in the memory 64 and the recording of feedback relating to prior determinations. Through inductive inference, the lighting system 10 may classify the sensed data using pattern recognition. This classification may allow the lighting system 10 to learn, or become more likely to automatically recognize, complex patterns. Through machine learning, the lighting system 10 may additionally distinguish between patterns, allowing one or more controller 61 included in the lighting system 10 to make an intelligent prediction on the data received by the sensor.

A person of skill in the art will appreciate that the lighting system 10 of the present invention may include various additional operations and determinations to improve the execution and accuracy of the analysis performed on the environmental light 48 sensed by the sensor and transmitted to the controller 61. As a result, skilled artisans will not limit the learning techniques to the aforementioned examples of neural networks and machine learning. Instead, those of skill in the art will appreciate a plethora of additional branches of advanced computing and artificial intelligence, including analyses based on pattern recognition and error detection, to be included within the scope of the present invention.

As previously mentioned, according to an embodiment of the present invention, the lighting system 10 may include a plurality of nodes connected through a network 69. Each node may include at least one of a light source, sensor, and controller 61. Skilled artisans will appreciate that the light source and the sensor may be included as a light emitting semiconductor device 40, such as an LED. The nodes may intercommunicate with one another through the transmission and receipt of data light 45. If a node receives data light 45 that is addressed or intended for another node, the unintended recipient node may rebroadcast the data to be received by another node, such as the intended node.

The nodes in the network 69 may communicate, for example, by transmitting a digitally encoded data light 45 among the nodes in the network 69. The data light 45 may include modulated or otherwise controlled pulses, which may include transmittable data. The data light 45 may be modulated using pulse width modulation (PWM), pulse interval modulation (PIM), or an additional modulation technique that would be appreciated by those of skill in the art.

According to an embodiment of the present invention, the data transmitted in the data light 45 may be transmitted at a high data rate. To accomplish high data rates, the lighting system 10 may increase the quantity of data transmitted per channel and/or increase the number of channels.

To increase the data transmitter per channel, the data light 45 may be transmitted with an increased modulation frequency signal. The more frequently the data light 45 is be modulated between the active and inactive states, or between logical ones and zeros, the more data may be transmitted to a receiving node in the network 69. To achieve increased frequency modulation, the light source emitting the data light 45 may use rapidly decaying modulation techniques. In embodiments that include an array 39 of light emitting semiconductor devices 40, the rapidly decaying modulation may be accomplished, for example, by distributing the transmission of data light 45 across multiple light sources included in the array 39. The controller 61 of the lighting system 10 may distribute the emission of data light 45 among various light sources. The controller 61 may overlap switching between active and inactive states across multiple light sources, which may advantageously provide faster switching than would be achieved by using a single light source. Additionally, including high speed switches may allow further increased switching, which may correspond to increased data rates.

The data light 45 may include at least one channel through which data may be transmitted. For example, a single channel transmission of data light 45 may occur at or about 445 nanometers. Using a single channel, the theoretical maximum rate at which data light 45 may be transmitted may be bound by the rate at which the single channel may be modulated.

According to an embodiment of the present invention, the data light 45 may be modulated across a plurality of channels. Each channel of data light 45 may be defined respective to a characteristic of that channel, such as the wavelength of light at which the data light 45 is transmitted. Additionally, each channel may be directed to one or more node within the network 69. In multi-channel transmission of data light 45, all channels may be directed to the same node. Alternatively, a number of channels of data light 45 transmitted from a first node may be directed to any number of separate nodes, each of which receiving one or more channels of data light 45. Nodes may address one another sequentially and/or in parallel. In other words, each node may address one or more additional nodes substantially simultaneously by transmitting data light 45 over a plurality of channels.

Referring now to FIGS. 42-43, an example of a five-channel transmission of data light 45 will now be discussed. The five-channel transmission of data light 45 may include five streams of data to be received by another node in the network 69. The five data channels may be transmitted at five different wavelengths of light. The wavelengths of each data channel may be generated by including various conversion materials 30A, 300, 30D, 30E, and 30F adjacent to one or more light sources, such as light emitting semiconductor devices 40.

More specifically, and provided without limitation, the five channels of data light 45 may be transmitted at 445, 460, 485, 495, and 510 nanometers. These wavelengths may appear visually similar to human observers, yet would be very distinct to a sensor configured to detect the discrete wavelengths. Each channel of data light 45 may be emitted by a respective light source, or wavelength conversion material 30 that may receive and convert the illuminating light 44 from a light source, at the appropriate wavelength. The channels of data light 45 are illustrated in FIG. 43, with each channel correlating to a conversion material 30 applied to the array 39 of lighting emitting semiconductor device of FIG. 42.

Additionally, each sensor may discretely detect the data light 45 at each wavelength respective to the channel it has been emitted. Optionally, the lighting system 10 may use a wavelength conversion material 30 to convert environmental light 48 prior to being detected by the sensor. The detected channels of data light 45 may then be communicated to the controller 61, which may combine the data from each channel to receive the data included in the data light 45.

Skilled artisans will appreciate that embodiments of the present invention may include any number of channels at which data light 45 may be transmitted. Additionally, a person of skill in the art will appreciate that virtually any wavelength, or range of wavelengths, may be used to include light at a given channel. As such, a person of skill in the art will not view the use of three channels, or the specified illustrative wavelengths of each channel, as limiting the present invention in any way.

According to an embodiment of the present invention, the sampling rate at which the environmental light 48 may be detected can be variable. The sampling rate may be varied manually, dynamically, and/or according to a predetermined pattern. For example, if the lighting system 10 detects that minimal changes exist between sampling periods of the environment, the lighting system 10 may decrease the sampling rate at which environmental light 48 is detected. Alternatively, if the lighting system 10 detects a high degree of variance between sampling periods, the lighting system 10 may increase the sampling rate to detect changes in the environment with an increased level of detail.

According to an additional embodiment of the present invention, the data light 45 may be transmitted at one or more bit rate. The bit rate may be adjusted relative to a plurality of factors, including the quantity of data to be transmitted, the quantity of errors detected in the data transmission, distance at which the data may be transmitted, or any number of additional factors that may affect data transmission bit rates.

As an example, the bit rate at which data light 45 is transmitted may be dynamically variable according to the type and quantity of data being transmitted. As an example, the node may transmit a series of images detected from the environment to another node. The image may include varying levels of detail, which may correspond to a varying quantity of data to be transmitted. As the quantity of data needing to be transmitted may vary, so may the bit rate at which the data may be transmitted. Inclusion of a dynamically variable bit rate may allow for the allocation of additional data transmission resources for more complex, and therefore data intensive, portions of a data transmission. Similarly, a dynamically variable bit rate may conserve the amount of data transmitted for relatively simple portions of a data transmission.

According to an embodiment of the present invention, the data included in the data light 45 may be compressed prior to transmission to another node, or other device, in the network 69. Additionally, the data may be decompressed after it has been received by a node. Data compression may reduce the amount of data to be included in the data light 45, further increasing the effective amount of data that may be transmitted using a channel of data light 45. Skilled artisans will appreciate data compression, as many methods of which are known within the art.

According to an embodiment of the present invention, a node may determine its location the environment with respect to other nodes connected in the network 69. A node may also determine the location of other nodes in the environment. Multiple nodes within the network 69 may be aware of a plurality of details relating to additional nodes in the network 69, including the location, operation, and status of the respective nodes.

A node may use a location determining operation, such as, for example, triangulation, to determine its location in an environment. Using triangulation, a node may receive a signal from a plurality of other nodes. The signal may include information to be analyzed by the receiving node to determine its location. For example, a signal used to determine the location of a node may include an identification of the transmitting node, an indication that the signal is transmitted to determine a location, a time stamp from which a transmission delay may be calculated, and/or additional information that would be apparent to a person of skill in the art.

According to an embodiment of the present invention, the lighting system 10 may include one or more wavelength conversion materials 30 that are sensitive to wavelength ranges that may be emitted or absorbed by a substance, such as a biological agent or bomb dust. Such a wavelength conversion material 30 may be used in connection with the sensor, which may be a light emitting semiconductor device 40, to determine a difference between a detected level of an indicative wavelength range and the normal level of an indicative wavelength range. If the difference detected is indicative of the substance, for example, the difference being above a threshold level, the lighting system 10 may generate an alert which may be received by another device connected to the network 69, or a user. Applications for this embodiment may include airports, embassies, government buildings, base camps, or virtually any additional location wherein the detection of a substance in an environment may be desired.

The lighting system 10 may operate to detect the substance in an environment. The lighting system 10 may include a conversion material 30 between the environment and the sensor to convert a difference in luminosity of one or more wavelength of light reflected, emitted, or absorbed from a substance in the environment to be detectable by the sensor. The light source and the sensor may be included as a light emitting semiconductor device 40, such as an LED. In the interest of clarity, the following examples may refer to a light emitting semiconductor device 40, or more specifically an LED, as the light source and sensor. Reference to a light emitting semiconductor device 40 and/or an LED is not intended to be limiting the light source and/or sensor to be included in the present invention. Also, the accompanying waveforms have been provided as relative waveforms, and should not be considered limiting.

The detectable substance may reflect, emit, or absorb light within a wavelength range respective to the substance. A conversion material 30 may be included between the LED and the environment that is sensitive to a wavelength range corresponding with the wavelength range of the detectable substance. Substances may include toxins, biological agents, contaminants, molecules, or virtually any other substance that may absorb or emit a detectable wavelength range of light.

Figure 44:
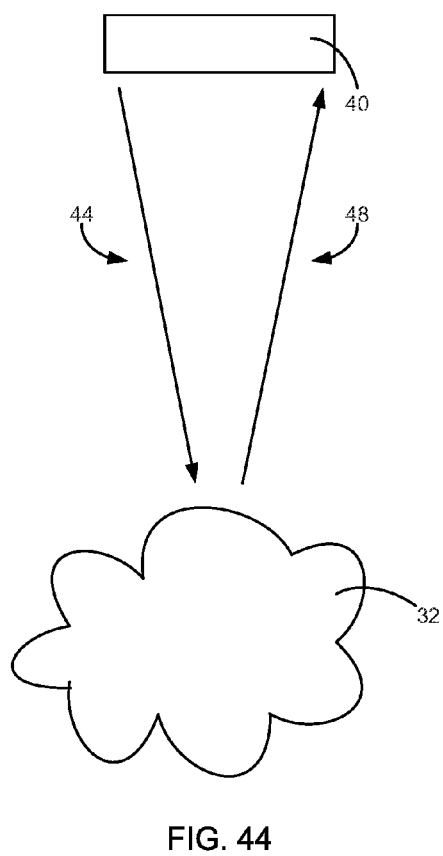
FIG. 44 is a block diagram of detecting a substance in the environment, according to an embodiment of the present invention.
Figure 45A:
Figure 45C:
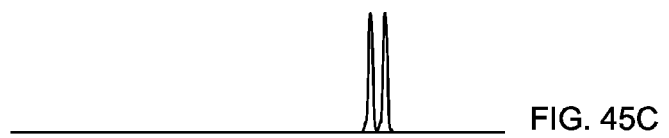

Referring now to FIG. 44-45, an example of a substance detection operation will now be discussed. Illuminating light 44 may be emitted from a light emitting semiconductor device 40 into the environment. The relative wavelength range of the emitted illuminating light 44 is illustrated in FIG. 45A. At least part of the illuminating light 44 may be reflected from the substance 32 as environmental light 48. However, the substance 32 may absorb at least part of the illuminating light 44, resulting in a wavelength range of illuminating light 44 that was originally emitted by the light emitting semiconductor device 40 not being included in the reflected environmental light 48. The reflected environmental light 48 indicative of a substance 32 is illustrated in FIG. 45C.

Figure 45E:
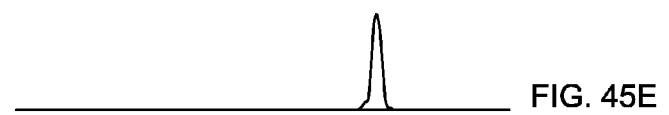

The light emitting semiconductor device 40 may detect the environmental light 48, which may be analyzed by the controller 61 to determine a difference between the emitted illuminating light 44 and the detected environmental light 48. The difference is represented in FIG. 45E. The controller 61 may then compare the wavelength range at which the difference of light occurs with information included in the memory to determine which material is present in the environment. Alternatively, the controller 61 may compare the difference of light with information included in the memory of another device connected to the network 69.

Figure 46:
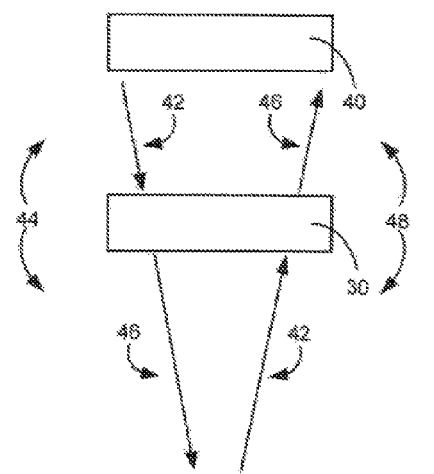
FIG. 46 is a block diagram of detecting a substance in the environment using a wavelength conversion material, according to an embodiment of the present invention.

Referring now to FIGS. 46-47, an example of a substance detection operation including a wavelength conversion will now be discussed. Illuminating light 44 may be emitted from a light emitting semiconductor device 40 to be received by a conversion 30 material as source light 42. The emitted illuminating light 44 is illustrated in FIG. 47A. The conversion material 30 may convert the source light 42 into a converted light 46, which may be emitted into the environment as illuminating light 44. The converted illuminating light 44, 46 is illustrated in FIG. 47B.

At least part of the illuminating light 44 may be reflected from the substance 32 as environmental light 48. However, the substance 32 may absorb at least part of the illuminating light 44, resulting in a wavelength range of illuminating light 44 that had originally been emitted by the light emitting semiconductor device 40 not being included in the reflected environmental light 48. The partially reflected environmental light 48 indicative of a substance 32 is illustrated in FIG. 47O.

Figure 47A:
FIGS. 47A-E are diagrams indicating the relative luminosity of the channels generated by the array of FIG. 46.
Figure 47B:
Figure 47C:
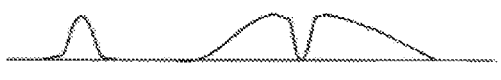
Figure 47D:
Figure 47E:

The environmental light 48 indicative of the substance 32 may be received by the conversion material 30 as source light 42 to be converted into converted environmental light 46, 48, which may be received by the light emitting semiconductor device 40. The converted environmental light 46, 48 is illustrated in FIG. 47D. The light emitting semiconductor device 40 may detect the environmental light 48, which may be analyzed by the controller 61 to determine a difference between the emitted illuminating light 44 and the detected environmental light 48. The difference is represented in FIG. 47E. The controller 61 may then compare the wavelength range at which the difference of light occurs with information included in the memory 64 to determine which material may be present in the environment. The controller 61 may consider the preceding wavelength conversion as it performs analysis on difference detected in the environmental light, for which it may compensate. Alternatively, the controller 61 may compare the difference of light with information included in the memory 64 of another device connected to the network 69.

According to an embodiment of the present invention, the lighting system 10 may generate an alert upon the occurrence of an event. The alert may be transmitted to an additional node included in the network 69, an otherwise network connected device, or displayed to an observer. An event that may initiate an alert may involve the detection of a condition in the environment, such as the presence of an object or substance. The event may alternative initiate an alert if a condition rises above a threshold level, which may be predefined or dynamically determined. The communication across the network 69 may be performed digitally. Alternatively, the communication of an alert may be performed by emitting an alerting wavelength, or a wavelength that has been designate to indicate that an alert has been generated. Furthermore, an alert may be communicated as the emission of visual light, for example, flashing red light upon the detection of a hazardous condition in the environment.

According to an embodiment of the present invention, a synchronization signal may be emitted among a plurality of nodes to synchronize the operation of the nodes. For example, the nodes may be synchronized to target, analyze, or confirm analysis of a condition of the environment. Alternatively, the synchronization signal may be used to synchronize the images or other visual representations of the environment. Furthermore, the synchronization signal may synchronize the shared processing efforts across at least part of the nodes included in the network 69. A person of skill in the art will appreciate a plethora of additional synchronization operations that may be performed with a synchronization signal after having the benefit of this disclosure.

According to an embodiment of the present invention, the analysis of the environmental light 48 detected in the environment, or other conditions detected in the by a sensor, may be shared across multiple nodes included in a network 69. The shared analysis of data may be performed, for example, using distributed computing, which would be appreciated by a person of skill in the art. Generally, distributed computing may organize a complex computation into multiple discrete computations, each of which may be distributed to one or more nodes across a network 69 to be performed in parallel. After the discrete computations have been completed, they results may be combined to a result from the complex computation.

According to an embodiment of the present invention, a wavelength conversion material 30 may be included between the light source and the environment to create a biologically affective light. The source light 42 may be a light emitting semiconductor device 40, such as, for example, an LED. The biologically affective light may include one or more wavelength ranges that may induce a biological effect in an organism. As an example, a conversion material 30 may be included to convert a source light 42 into a converted light 46 including wavelengths that increase the production of biological chemicals that affect alertness, such as melatonin.

A non-limiting example of selectively introducing a biologically affective wavelength range into an environment will now be discussed. In this example, the lighting system 10 may detect that a person is present in the environment. The lighting system 10 may make this determination by analyzing information received from detecting the environmental light 48. Such information may include heat signatures, proximate variance, movement, images, videos, patterns, or other detected information. The lighting system 10 may then enable one or more light source with an adjacently located biologically affective conversion material 30 to emit biologically affective converted light 46. The biologically affective light may induce the onset of sleepiness for the people in the environment. Due to the effects of sleepiness, the people in the room may become less alert, slowing response times, and providing for a tactical advantage for any subsequent operations performed in that environment.

The following embodiments are intended to illustrate the components of the present invention in operation, wherein the lighting system 10 may sense one or more condition present in the environment by sensing environmental light 48. A person of skill in the art will appreciate that the following embodiments are included in the interest of clarity, and are not intended to impose any limitations on any of the embodiments the present invention. After having the benefit of this disclosure, a skilled artisan would appreciate additional embodiments consistent with the scope and spirit of the invention described in this disclosure to be included herein.

Referring now to FIGS. 48-51, an embodiment of the lighting system 10 including an array 39 to detect and compare a series of images with moderately low resolution will now be discussed. In this embodiment, the light sources and sensors may be light emitting semiconductor device 40. The light emitting semiconductor devices 40 may be configured in an eight-by-eight square array 39. However, skilled artisans will appreciate that any number of light emitting semiconductor devices 40 may be configured in an array 39 of virtually any shape, as it may be included in single- or multi-dimensional configurations.

Operation of the light emitting semiconductor devices 40 included in the array 39 may be selectable between emitting illuminating light 44 and detecting environmental light 48. The light emitting semiconductor devices 40 may be selectable between emitting and detecting at intervals independent of one another, overlapping intervals, or substantially simultaneously. Additionally, the light emitting semiconductor devices 40 may be selectable between emitting and detecting repeatedly, effectively cycling through periods of light emission and detection.

As one or more light emitting semiconductor device 40 may detect the environmental light 48 in the environment, the light emitting semiconductor device 40 may transmit data regarding the detected environmental light 48 to the controller 61 for analysis. The controller 61 may concatenate each point of data, as may be sensed by the light emitting semiconductor devices 40, to create an image. The image may have a resolution relative to the number of light emitting semiconductor devices 40 included in the array 39 and the number of points in the environment from which environmental light 48 may be sensed by each light emitting semiconductor device 40.

Referring now to FIG. 48, an illustrative image sensed by the lighting system 10 will now be discussed. This illustrative image may have been detected by a fixture located above a target environment, facing downward. The relative luminosity of light detected in the environment, which may be indicative of an object being located in the environment, may be represented by a scale of values. In the present illustrative image, the scale of values ranges from zero to four. However, a person of skill in the art will appreciate that the scale of values may include any number of intervals between a minimum and maximum value.

A plurality of objects may be located in the environment. A first and second object may be located approximately in the top half of the area to be sensed by the lighting system 10. Since the tallest point of the object may be located near the object's center, the amount of light reflected from the environment proximate to the object may be greater than other points wherein the object is not present. Additionally, a third object may be located approximately in the bottom left portion of the area to be sensed by the lighting system 10.

In the example illustrated by FIG. 48, the light emitting semiconductor device 40 may sense a saturating amount of environmental light 48 from the first object at location (3,5), with varying levels of luminosity surrounding the saturated areas. The light emitting semiconductor device 40 may sense a saturating amount of environmental light 48 from the second object at location (6,6), with varying levels of luminosity surrounding the saturated areas. Furthermore, the light emitting semiconductor device 40 may sense a saturating amount of environmental light 48 from the third object at locations (3,1) and (3,2), with varying levels of luminosity surrounding the saturated areas.

The controller 61 may process the levels sensed by the light emitting semiconductor devices included in the array 39 to determine that an object is present in the environment that the lighting system 10 may detect. The controller 61 may then, for example, control the light emitting semiconductor device 40 to increase the emission of illuminating light 44 as a result of an object being present in the environment. The controller 61 may additionally analyze the proximate variance, which may be used to determine the location and movement of the objects, to make a determination of condition in the environment. For example, the controller 61 may determine that the first and second objects are likely humans engaged in a conversation. The lighting system 10 may then enable a microphone, which may be included in, or connected to, the lighting system 10 to sense an additional condition of the environment, such as conversation dialog in the present example. A person of skill in the art will appreciate additional sensors that may sense information from an environment that would be included in the scope of the present invention.

Additionally, in an embodiment of the present invention, the lighting system 10 may communicate the sensed conditions by using the data communications discussed above, such as transmitting data through a series of pulsed light emissions. The lighting system 10 may transmit or relay the information sensed by the additional environmental sensors to one or more additional node, which may be included in the network 69.

The lighting system 10 may continue to sample the environment by sensing the luminosity of environmental light 48 present in the environment. By continually sampling the environment, the controller 61 may analyze the sensed environmental light 48 to make further determinations regarding the conditions of the environment. Additionally, as additional nodes may be added to the network 69, the computational power of the network 69 of nodes may be increased, respectively. This increase of computational power may be accomplished by, for example, distributed computing.

Light emitting semiconductor devices 40 may comprise different semiconductor materials and/or be located adjacent to different conversion materials 30 to detect the luminosity of light relative to different wavelengths. These wavelength based luminosities may be analyzed by the controller 61 to generate an image respective to the different wavelengths. An example of an image representative of multiple wavelength ranges may include a color image. Referring additionally to FIG. 49, the relative luminosity of each sampled point in the environment may be converted into a visual representation, which may use color or shading to represent the luminosity and wavelength levels detected in the environment.

Referring now additionally to FIG. 50, a subsequent image may additionally be sensed by the lighting system 10. The subsequent image may be sensed similar to the sensing operation described in relation to FIG. 48. Referring to FIG. 50, a subsequent sensing operation may sense the objects located in the environment. In this example, the first and second objects may be located approximately in the same positions as wherein the environment was sensed or sampled in the example of FIG. 48. In this subsequent sensing operation, the light emitting semiconductor device 40 may sense a saturating amount of environmental light 48 from the first object at locations (3,5) and (3,6), with varying levels of luminosity surrounding the saturated areas. The light emitting semiconductor device 40 may additionally sense a saturating amount of environmental light 48 from the first object at locations (7,5) and (7,6), with varying levels of luminosity surrounding the saturated areas.

The controller 61 may process the levels sensed by the light emitting semiconductors included in the array 39 to determine that the first and second objects is present in the field in which the lighting system 10 may sense. The controller 61 may additionally determine that the object have not substantially relocated since the last sampling period. The controller 61 may, however, determine that the light reflective patterns of the objects are shifting slightly between each sampling period. The controller 61 may additionally determine, for example, that this shifting pattern is indicative of conversation.

The light emitting semiconductor device 40 may additionally sense a saturating amount of environmental light 48 from the third object at locations (7,1) and (7,2), with varying levels of luminosity surrounding the saturated areas. The relocation of the object between sampling periods may indicate that motion has occurred. The controller 61 may then, for example, determine that a third person or object is patrolling the environment. The lighting system 10 may continue to detect images from the environment, which it may compare to other images to detect further patterns. For example, if the person at the bottom of the screen continually moves in a substantially repeatable pattern, the lighting system 10 may determine with increased confidence that the person is patrolling than simply crossing the environment.

A person of skill in the art will appreciate that the environmental light 48 sensed by the light emitting semiconductor need not saturate the light emitting semiconductor to result in a sensed condition in the environment. The controller 61 may analyze sensed environmental light 48 that does not include a saturating amount of environmental light 48 to determine a condition may exist in the environment. Additionally, a person of skill in the art will appreciate that as the levels of light detected by the light emitting semiconductor may increase, the accuracy of the analysis performed by the controller 61 may correspondingly be increased.

A sensed environment of FIG. 50 may be visually represented as an image, such as illustrated in FIG. 51. The images of FIGS. 49 and 51 may be concatenated into a series of images, for example, to form a video with each image being a frame of the video. The sensed image of FIG. 51 may be compared to one or more other images sensed by the lighting system 10 to determine patterns and differences between the images. The patterns may be analyzed to detect conditions in the environment, such as the presence of an object or person, movement, or other conditions.

According to an embodiment of the present invention, an array 39 of sensors capable of detecting a high resolution image, will now be discussed along with FIGS. 52-54. In this example, an array 39 of light sources and sensors, which may be included as a light emitting semiconductor device 40, may be located on a plane facing a detectable object. In the present example, and without limitation, the array 39 may be included on one or more walls, positioned in alignment to the face of a target person to be detected. A person of skill in the art will appreciate that one or more nodes including additional arrays 39 may be communicatively connected at varying points in the environment to increase the resolution of the images and other conditions detected from the environment.

Figure 52:
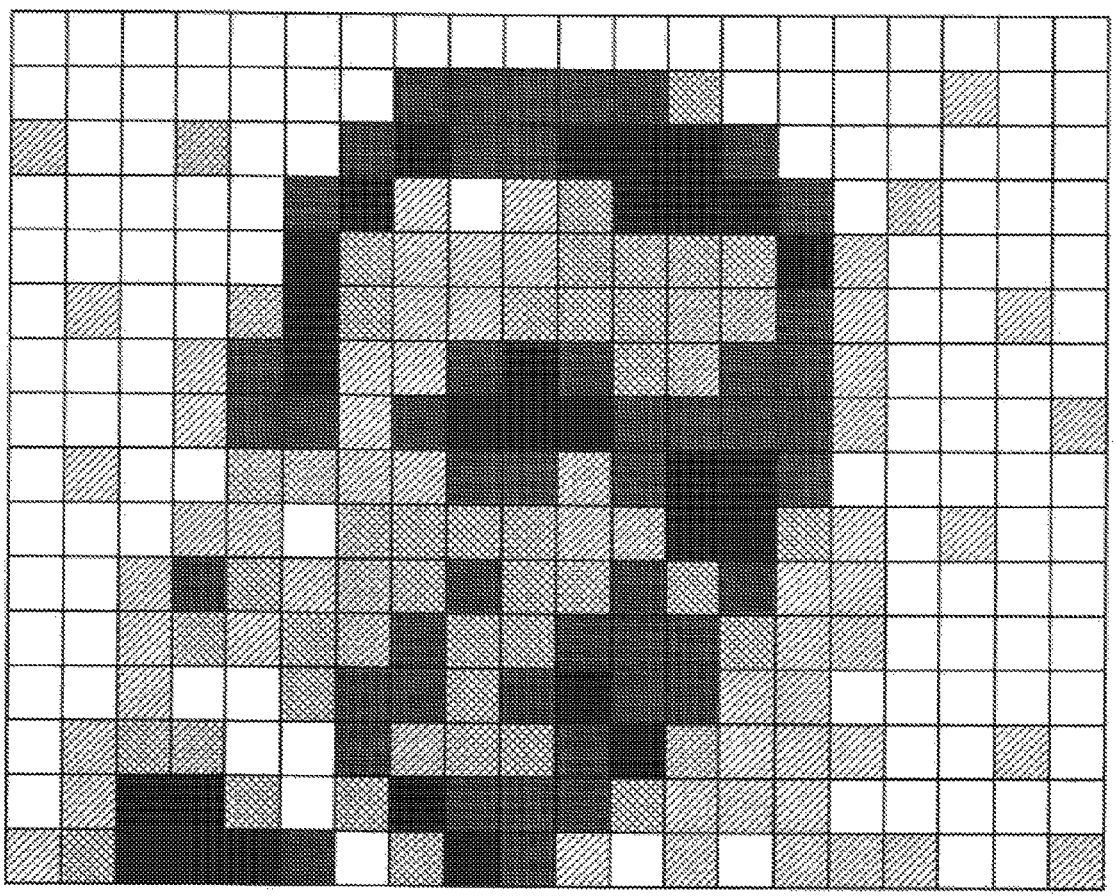
FIG. 52 is a diagram of an image created from sensed environmental light, according to an embodiment of the present invention.
Figure 53:
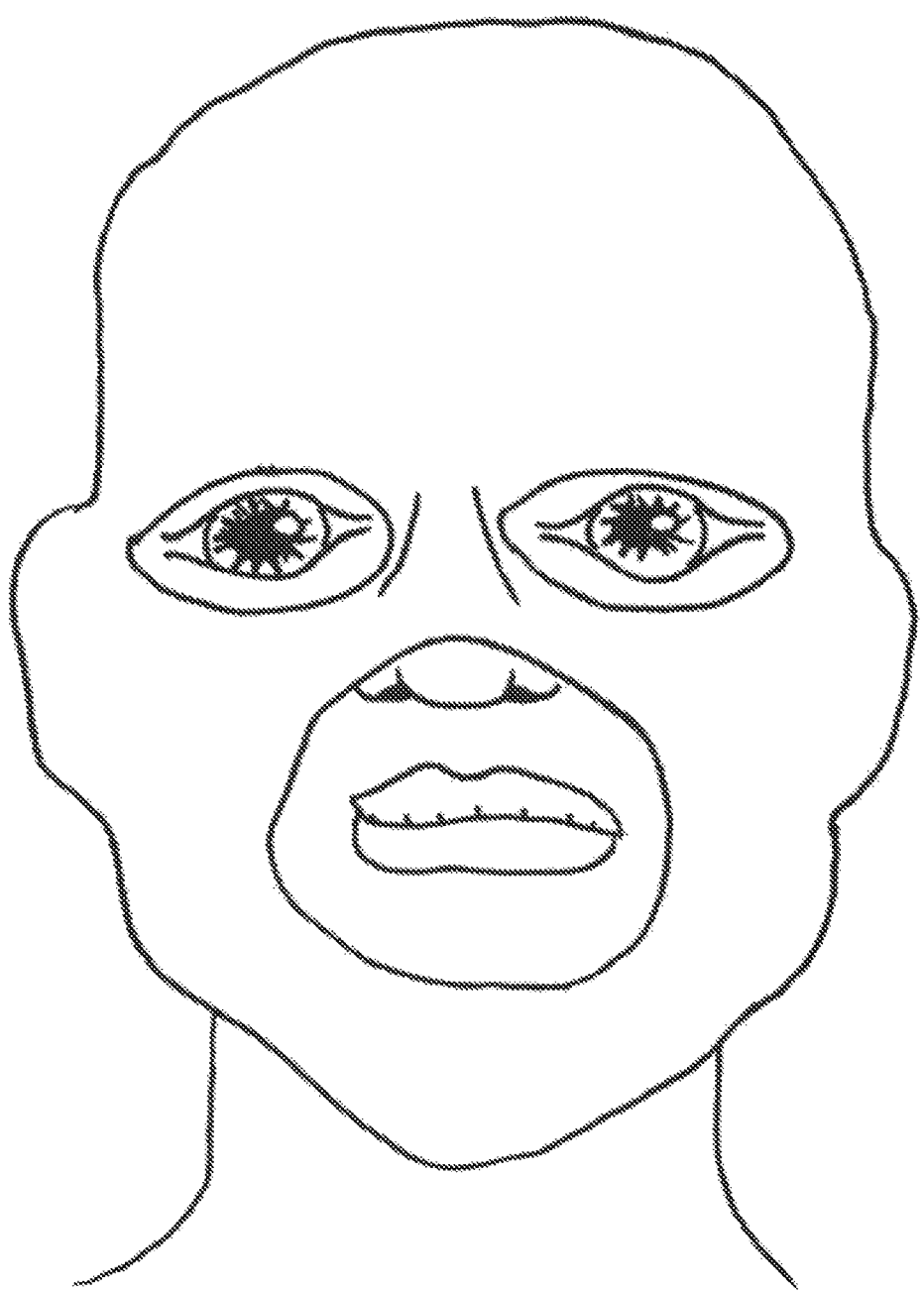
FIG. 53 is a diagram of an image created from sensed environmental light, according to an embodiment of the present invention.

Referring first to FIG. 52, an array 39 of sensors may detect an object in the environment with an increased level of detail than FIGS. 49 and 51 and other previous examples. As the lighting system 10 may sample an increased number of points in the environment, the resolution of the resulting image may be correspondingly increased. Referring additionally to FIG. 53, a further increased number of points being sampled by the lighting system 10 in the environment may result in a detected image of increasing resolution, which may clearly illustrate defining facial features. The facial features, or other defining features of a target person or object of interest, may be used identify the person or object of interest.

Figure 54:
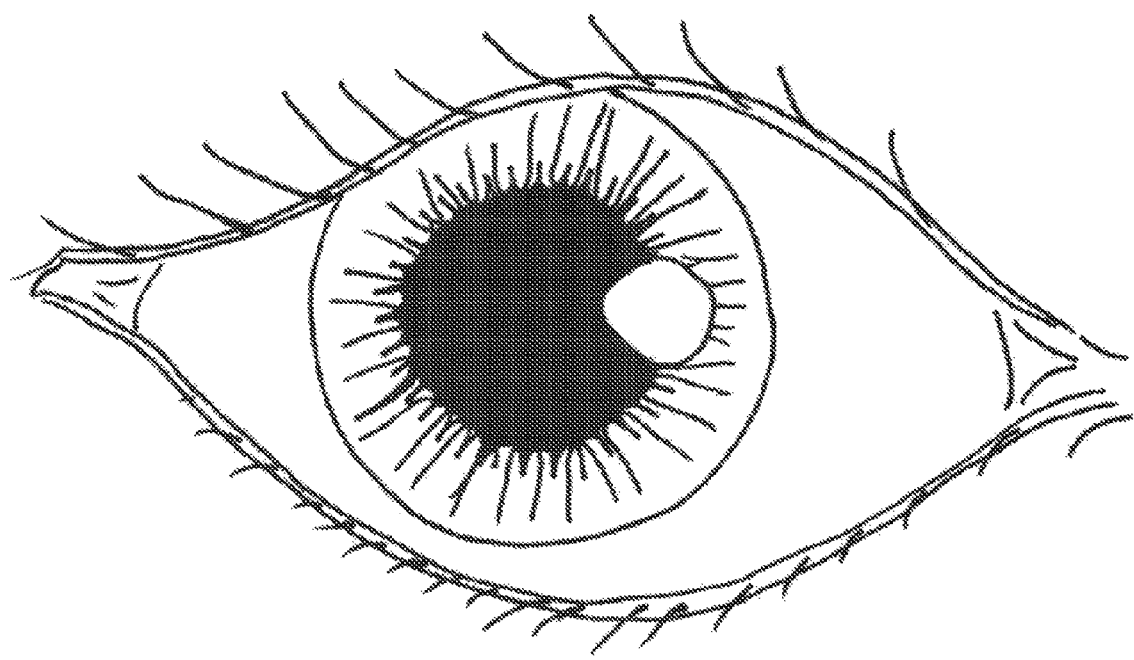
FIG. 54 is a diagram of an image created from sensed environmental light, according to an embodiment of the present invention.

Referring additionally to FIG. 54, an image of further enhanced resolution may be detected with sufficiently enough sensors directed to an object in the environment. As mentioned previously, the sensors may be may be light emitting semiconductor devices 40. The sensors may be configurable to focus on a small area within the environment to better identify the object. As presented in the illustrated example of FIG. 54, the object may be the eye of a person in the environment to be identified. The lighting system 10 may recognize the presence of an eye in the environment, to which defining features of the eye may be detected to identify the person with a high degree of accuracy.

Additionally, the sensors included in an array 39 may be focused on a narrow area in the environment by including a deformable or piezoelectric substrate. For example, the lighting system 10 may detect conditions of an environment generally, indicating that a person exists in the environment. The lighting system 10 may then adjust the sensors to detect environmental light 48 from an angle to focus on a more narrow area within the environment, providing higher resolution. Essentially, according to the present embodiment, the number points from which conditions of the environment may be detected would remain approximately the same, but the area in which the points are concentrated may be reduced to increase the resolution of an image.

The light emitting semiconductor devices 40 of the array 39 may intelligently alternate between emitting illuminating light 44, and sensing environmental light 48. The direction in which each light emitting semiconductor devices 40 faces may be movable, for example, by altering the deformable or piezoelectric substrate. The lighting system 10 may adjust the light emitting semiconductor devices 40 to emit illuminating light 44 in a generally forward direction during a portion of its duty cycle. This forward emission may advantageously make the lighting system 10 appear significantly indistinguishable from a normal lighting device to human observers.

However, during an additional portion of the duty cycle, the lighting system 10 may sense environmental light 48 from a targeted space within the environment. The lighting system may sense environmental light 48 from the targeted space with high resolution, such as to focus on an object in the environment with enhanced wavelength detection. During this focused detection, a substantial number of the light emitting semiconductor devices 40 in the array may be positionable to face the target object in the environment. This targeting operation may allow the lighting system 10 to detect environmental light from an increased number of points within a concentrated space relative to the detectable object. After the wavelength has been detected, the light emitting semiconductor devices 40 may be positioned to again emit an illuminating light 44 in approximately the forward direction.

According to an embodiment of the present invention, wherein the light sources and sensors are located around an environment in three dimensions, the lighting system 10 may detect a three-dimensional representation of the environment. The light sources and sensors may be included as a light emitting semiconductor device 40. A plurality of light emitting semiconductor devices 40 may be distributed throughout the environment to detect the distance of an object in the environment from the light emitting semiconductor device 40. A plurality of light emitting semiconductor devices 40 may determine the distance to an object from a plurality of angles, which may be located on a plurality of planes. The controller 61, or multiple controllers 61 intercommunicating across a network 69, may analyze the distances and angles detected by the light emitting semiconductor devices 40 in the lighting system 10 to determine the position of the object relative to the three-dimensional space of the environment.

More specifically, and without limitation, a plurality of lighting emitting semiconductor devices 40, or a plurality of arrays 39 or nodes including light emitting semiconductor device 40, may be located within the environment to be sensed at differing locations. In this configuration, the light emitting semiconductor devices 40 may be on different planes within the environment to sense environmental light 48 from differing angles and directions. One or more controller 61 may analyze the sensed environmental light 48 from the plurality of angles and directions to construct a multidimensional representation of the environment.

The controller 61 may construct a one-dimensional representation of the environment, collecting information regarding wavelength, chromaticity, and luminosity. The controller 61 may also construct a two-dimensional representation, when may be an image or video, as described above. Additionally, the controller 61 may construct a three-dimensional representation of the environment, showing the relative location of humans, objects, and substances in the environment. The calculations of three-dimensional representations of an environment may be computationally demanding. The computations may be distributed among the controllers 61 included in the network 69. In instances wherein additional processing may be required to render the three-dimensional environments, one or more additional controllers 61 or other processing devices may be communicatively connected to the network 69.

Figure 55:
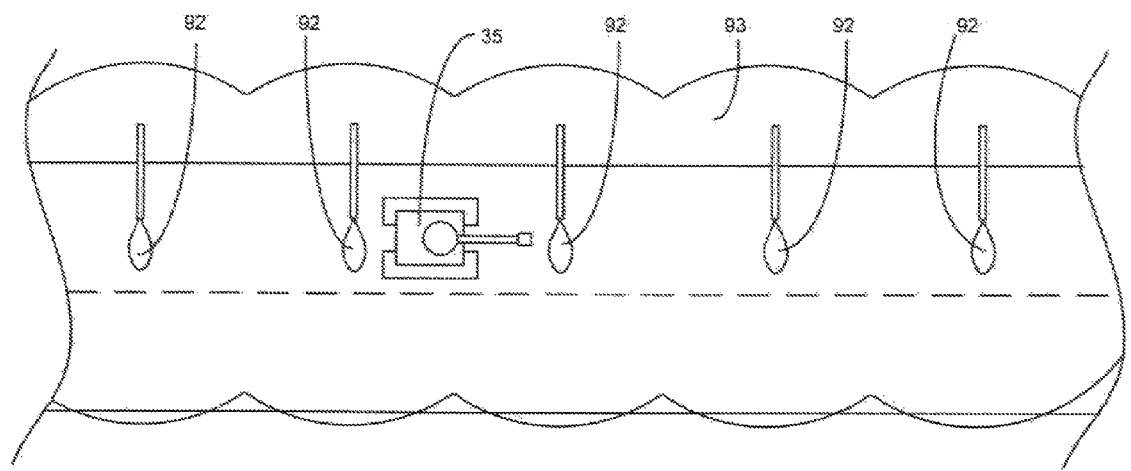
FIG. 55 is a top plan view of an array of nodes located along a roadway, according to an embodiment of the present invention.
Figure 56:
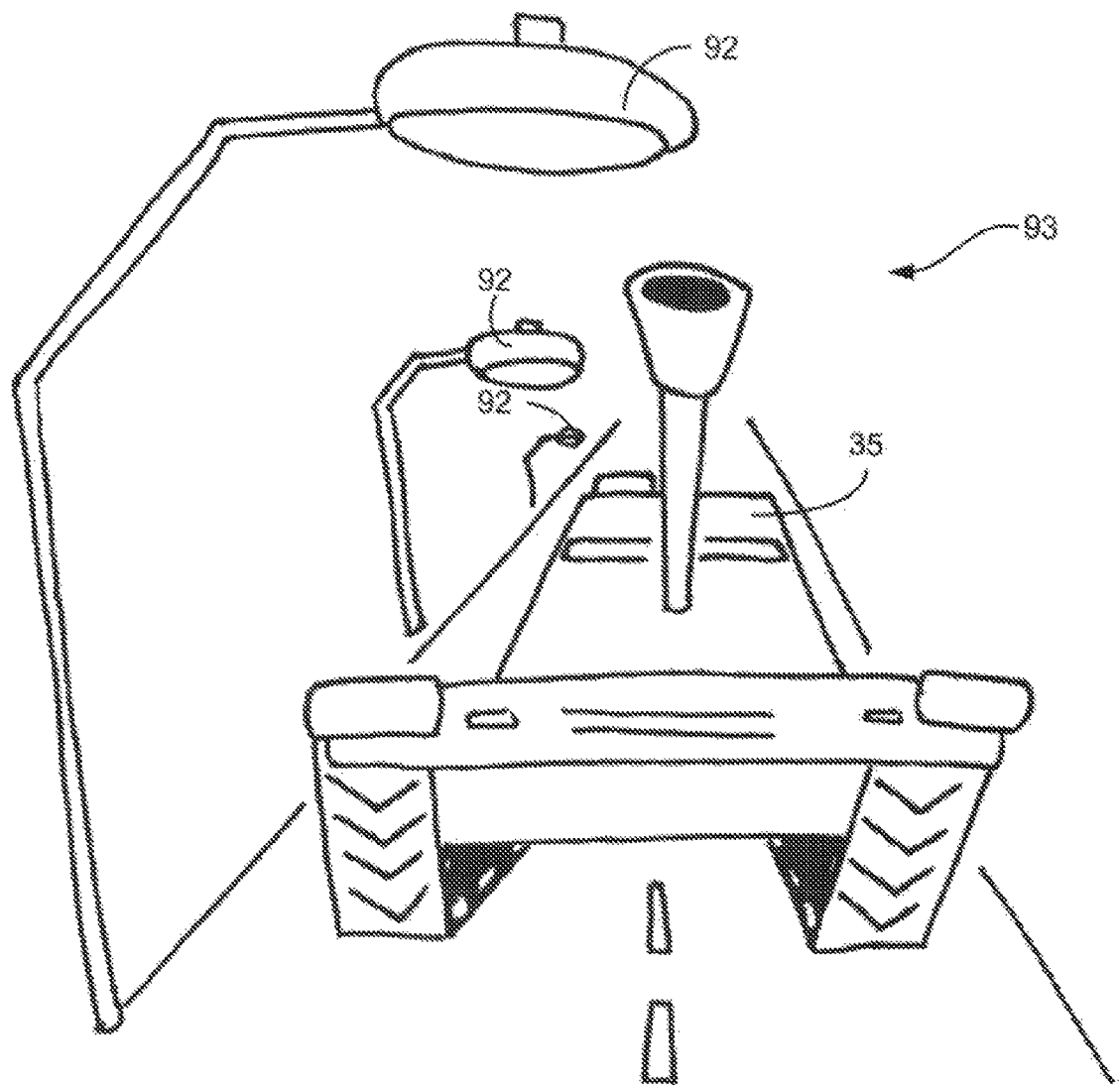
FIG. 56 is a front perspective view of an object sensed on the roadway illustrated in FIG. 55, according to an embodiment of the present invention.

Referring now to FIGS. 55-56, according to an embodiment of the present invention, the environment may be defined as a road or otherwise navigable pathway. Skilled artisans will not view variations of the present embodiment to be restricted to road or other pathways on which a motor vehicle may be operated. The light emitting semiconductor device 40 may be included in one or more streetlight 92 located near the road. The streetlight 92 may be located, for example, at least partially overhead of the road.

Each streetlight 92 may be a node within a network 69 of streetlights 92, which may collectively comprise the lighting system 10. The nodes may intercommunicate with one another by transmitting and receiving data light 45 or using another network communication protocol that would be appreciated by skilled artisans. The streetlights 92 may be able to detect the conditions of the environment, such as the road and objects 35 located on the road. Information relating to conditions of the may be transmitted to a device connected to the network 69. Each node included in the network 69 may detect conditions in an area of the environment located within view of the node. A plurality of nodes in the network 69 may communicate with one another such that they are aware of the conditions sensed by the other nodes, defining a field of view 93.

As a specific and non-limiting example, presented in the interest of clarity and without the intent to limit the present invention in any way, FIGS. 55-56 illustrate the use of streetlights 92 as nodes in a network 69. The streetlights 92 may detect an object 35, such as a tank in the present example, in the field of view 93. The streetlights 92 may be programmed to generate an alert upon sensing a tank on the road, which may be communicated to a node or device connected to the network 69 intended to receive the alert. The intended recipient node may be located, for example, in a town away from the sensing street light 92, in a base camp, or included in another vehicle on the road.

Assuming the intended recipient node is a personnel carrier on the road headed in the direction of the tank, the lighting system 10 may alert the personnel carrier that the present route may be dangerous. The personnel carrier may include one or more node, for example, in the headlights of the personnel carrier. The headlight nodes may receive data light 45 broadcast from one or more streetlight 92 lining the road. An interface device onboard the personnel carrier may receive the alert, warning its occupants of the potential danger ahead and optionally suggesting an alternative route.

Skilled artisans will appreciate additional examples wherein the environment may include virtually any area or space, such as, for example, a room, base camp, ship, or city. Additionally, tracking of one or more objects 35 in the environment may be desired. The tracking may include geographic location information, operational status information, or any other information that may be associated with the object 35. For example, an operation command center may desire to track the location and status of a personnel carrier across a city. The personnel carrier may transmit data light 45 through its headlights, which may be received and distributed by the network 69 of streetlights 92 located throughout the city. The data light may be repeated and/or relayed until it may be received by the operation command center. The data light 45 may include information relating to the proximate location, fuel level, number of passengers, speed, or virtually any other communicable information relating to the personnel carrier.

According to an embodiment of the present invention, the lighting system 10 may include night vision operation. The light emitting semiconductor devices 40 included in the lighting system 10 may broadcast a light that is outside of the spectrum of light that is visible to humans, such as infrared or ultraviolet light. Additional conditions of the environment may also be detected, such as heat signatures, by emitting and detecting non-visible light.

According to an embodiment of the present invention, one or more array 39 included in the lighting system 10 may include a sensor, and not a light source. A light emitting semiconductor device 40 may be used as the sensor, however it may be configured or controlled to not emit illuminating light 44. The array 39 of sensors may detect environmental light 48 of various wavelengths, such as, but not limited to, infrared light. Skilled artisans will appreciate that infrared light may be indicative of heat signatures, which may relate to one or more object 35 detected in the environment.

According to an embodiment of the present invention, a low latency power supply may be included in the lighting system 10 to supply power to the controller 61, one or more light source, and any additional component that may be included in the lighting system 10. The power supply may have a switching latency equal to or less than that of the slight sources included in the lighting system 10, such that the power supply does not restrict the switching speed, and thus potentially the sampling rate of the environment and/or the transmission speed of data included in the data light 45. Additional efficient electronic components, which be defined by high switching rates and/or low decay periods, may be included in lighting system 10. Additionally, fast decay phosphors, fluorescent, or other wavelength conversion materials 30 may be used in the lighting system 10 to provide fast switching between emission and detection of light for each light source.

According to an embodiment of the present invention, additional devices may be connected to the network 69. The additional devices may communicate with one or more node included in the network 69. An additional device may communicate with the node using data light 45 or another network communication protocol that would be appreciated by a skilled artisan. Examples of additional device connected to the network 69 may include, but are not limited to, a flashlight, keychain, watch, headlight, router, television, computer, pen, or virtually any other device that may include a sensor, controller, memory, and optionally a light source.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A lighting system comprising:
   a light source included in an array to emit illuminating light, the array including a plurality of light sources;
   a sensor included in the array configured to sense environmental light from an environment; and
   a controller operatively connected to each of the sensor and the light source and configured to analyze the environmental light sensed by the sensor to at least one of detect and generate data relating to a condition of the environment, the data being transmittable in a transmitted data light;
   wherein the controller is configured to receive data included in a received data light using the sensor; and
   wherein the controller is configured to analyze the data included in the received data light and to control the transmission of the data light from the light source;
   wherein the controller is configured to analyze the environmental light by measuring a drive voltage of the light source, determining a difference between a measured voltage across the light source and the drive voltage, and performing time-domain matching of the measured voltage and the environmental light using cross-correlation.

2. The lighting system according to claim 1 wherein the light source is selectively operable between a sensing operation and an emitting operation, the sensing operation being defined by the light source sensing the environmental light, and the emitting operation being defined by the light source emitting the illuminating light.

3. The lighting system according to claim 2 wherein the array includes a plurality of light emitting semiconductor devices; and wherein each of the plurality of light emitting semiconductor devices in the array is selectively operable between the sensing operation and the emitting operation.

4. The lighting system according to claim 1 wherein the sensor is configured to sense the environmental light substantially simultaneously with the light source emitting the illuminating light.

5. The lighting system according to claim 1 wherein the light source includes a light emitting diode (LED); and wherein the sensor includes a photodiode to sense the environmental light.

6. The lighting system according to claim 1 further comprising a network comprised of nodes; wherein each node includes the light source, the sensor, and the controller; and wherein the nodes are configured to intercommunicate by transmitting and receiving the data light.

7. The lighting system according to claim 6 wherein the data light includes at least one addressing bit to address the node intended to receive the data.

8. The lighting system according to claim 6 wherein each of the nodes in the network are proximately aware of additional nodes in the network.

9. The lighting system according to claim 8 wherein the controller of each node included in the network of the nodes is configured to receive feedback regarding an analysis performed by the controller to be stored in memory.

10. The lighting system according to claim 9 wherein the controller is configured to use at least one of machine learning and a neural network to analyze the feedback from the analysis.

11. The lighting system according to claim 1 wherein the data included in the data light includes at least one error detection bit.

12. The lighting system according to claim 1 further comprising a wavelength conversion material positioned between the light source and the environment to absorb at least part of a source light and emit a converted light having a converted wavelength range, the source light being received and absorbed by the wavelength conversion material.

13. The lighting system according to claim 12 wherein the converted wavelength range of the converted light varies depending on a condition in the environment.

14. The lighting system according to claim 1 wherein the data light is defined by a data wavelength defined relative to the illuminating light.

15. A lighting system, comprising:
   a network of nodes, each node comprising:
      a light source included in an array to emit illuminating light, the array including a plurality of light sources,
      a sensor included in the array configured to sense environmental light from an environment, and
      a controller operatively connected to each of the sensor and the light source and configured to analyze the environmental light sensed by the sensor to at least one of detect and generate data relating to a condition of the environment, the data being transmittable in a transmitted data light to another node of the network of nodes,
   wherein the controller is configured to receive data included in a received data light from another node of the network of nodes using the sensor,
   wherein the controller is configured to analyze the data included in the received data light and to control the transmission of the data light from the light source;
   wherein each of the nodes in the network are proximately aware of additional nodes in the network; and
   wherein the controller of each node included in the network of the nodes is configured to receive feedback regarding an analysis performed by the controller to be stored in memory.

16. The lighting system according to claim 15 wherein the data light includes at least one addressing bit to address the node intended to receive the data.

17. A lighting system comprising:
   a light source included in an array to emit illuminating light, the array including a plurality of light sources;
   a sensor included in the array configured to sense environmental light from an environment;
   a wavelength conversion material positioned between the light source and the environment to absorb at least part of a source light and emit a converted light having a converted wavelength range, the source light being received by the wavelength conversion material; and a controller operatively connected to each of the sensor and the light source and configured to analyze the environmental light sensed by the sensor to at least one of detect and generate data relating to a condition of the environment, the data being transmittable in a transmitted data light;

wherein the controller is configured to receive data included in a received data light using the sensor; and wherein the controller is configured to analyze the data included in the received data light and to control the transmission of the data light from the light source.

* * * * *